(12) United States Patent  
Masuda et al.

(10) Patent No.: US 11,942,023 B1
(45) Date of Patent: Mar. 26, 2024

(54) DISPLAY DEVICE

(71) Applicant: Sharp Display Technology Corporation, Kameyama (JP)

(72) Inventors: Junichi Masuda, Kameyama (JP); Shugo Yagi, Kameyama (JP); Yuuichi Kanbayashi, Kameyama (JP); Satoshi Tsubooka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/233,356

(22) Filed: Aug. 14, 2023

(30) Foreign Application Priority Data

Sep. 30, 2022 (JP) .................. 2022-157263

(51) Int. Cl.
*G09G 3/00* (2006.01)
*G02F 1/13357* (2006.01)
*G09G 3/20* (2006.01)
*G09G 3/34* (2006.01)

(52) U.S. Cl.
CPC ..... *G09G 3/2096* (2013.01); *G02F 1/133603* (2013.01); *G09G 3/342* (2013.01); *G09G 2320/0247* (2013.01); *G09G 2320/0626* (2013.01); *G09G 2340/0435* (2013.01); *G09G 2358/00* (2013.01); *G09G 2380/10* (2013.01)

(58) Field of Classification Search
CPC ................ G09G 3/2096; G09G 3/342; G09G 2320/0247; G09G 2320/0626; G09G 2340/0435; G09G 2358/00; G09G 2380/10; G02F 1/133603
See application file for complete search history.

(56) References Cited

U.S. PATENT DOCUMENTS

2020/0005718 A1\* 1/2020 Fattal .................. G09G 3/3406

\* cited by examiner

*Primary Examiner* — Michael A Faragalla
(74) *Attorney, Agent, or Firm* — ScienBiziP, P.C.

(57) ABSTRACT

A display device includes a display panel, an illumination device, and a control unit, in which, when performing display in a first display mode, the control unit corrects an image signal to generate a correction signal, writes a first image based on the correction signal in the display panel, leaves a second light source unlit, and selectively turns on a plurality of first light sources based on the correction signal, and when performing display in a second display mode, the control unit generates a correction signal, writes a first image in the display panel, leaves the second light source unlit, and selectively turns on the plurality of first light sources based on the correction signal, in a first display period, and writes a second image based on the image signal in the display panel and turns on at least the second light source, in a second display period.

10 Claims, 20 Drawing Sheets

DISPLAY DEVICE

CROSS-REFERENCE TO RELATED APPLICATIONS

This application claims the benefit of priority to Japanese Patent Application Number 2022-157263 filed on Sep. 30, 2022. The entire contents of the above-identified application are hereby incorporated by reference.

BACKGROUND

Technical Field

The technique disclosed in the present specification relates to a display device.

A display device described in the specification of US Patent Application Publication No. 2020/0005718 is known as an example of a display device in the related art. The specification of US Patent Application Publication No. 2020/0005718 describes a privacy display as a display device, the privacy display being provided with a mode-switchable backlight. The mode-switchable backlight includes a first directional backlight that supplies narrow-angle emitted light in both a first mode and a second mode and a second directional backlight that supplies bi-directional emitted light only in the second mode, the bi-directional emitted light having a diverging angle range complementary to an angle range of the narrow-angle emitted light, and a combination of narrow-angle emitted light and bi-directional emitted light in the second mode supplies wide-angle emitted light having an angle range that is the sum of the angle range of the narrow-angle emitted light and the diverging angle range of the bi-directional emitted light.

SUMMARY

The first directional backlight and the second directional backlight described in the specification of US Patent Application Publication No. 2020/0005718 are both an edge-lit type using a light guide plate. It is difficult for such an edge-lit type backlight to perform so-called local dimming control in which luminance is controlled for each of a plurality of regions. In order to perform local dimming control, it is preferable that the backlight be of a direct-lit type. However, since the first directional backlight needs to transmit light from the second directional backlight, it is difficult to make the first directional backlight a direct-lit type. If local dimming control is performed by making only the second directional backlight the direct-lit type, there is a concern that the display quality of images displayed by the narrow-angle emitted light may deteriorate significantly.

The technique described in the present specification has been conceived based on the above-described circumstances, and thus aims to improve display quality.

(1) A display device relating to the technique described in the present specification includes a display panel including a first main surface, an illumination device that radiates light to the first main surface, and a control unit that controls the display panel and the illumination device, in which the illumination device includes a plurality of first light sources, a first light control unit that imparts an optical effect to light emitted from the plurality of first light sources, does not regulate emission of light in a first angle range around a first direction having an angle with respect to the first main surface, and regulates emission of light in a second angle range around a second direction having an angle different from the angle in the first direction with respect to the first main surface, a second light source, and a second light control unit that imparts an optical effect to light emitted from the second light source and causes the light to be emitted at least in the second angle range, and the control unit switches between display in a first display mode and display in a second display mode based on input of a display switching signal, when performing display in the first display mode, the control unit corrects an image signal to generate a correction signal, writes a first image based on the correction signal in the display panel, leaves the second light source unlit, and selectively turns on the plurality of first light sources based on the correction signal, and when performing display in the second display mode, the control unit causes a unit display period to include a first display period and a second display period, generates the correction signal, writes the first image in the display panel, leaves the second light source unlit, and selectively turns on the plurality of first light sources based on the correction signal, in the first display period, and writes a second image based on the image signal in the display panel and turns on at least the second light source, in the second display period.

(2) In addition to (1), the display device may be configured such that, when performing display in the second display mode, the control unit leaves all of the plurality of first light sources unlit in the second display period.

(3) In addition to (1), the display device may be configured such that, when performing display in the second display mode, the control unit turns on all of the plurality of first light sources in the second display period.

(4) In addition to any one of (1) to (3), the display device may be configured such that, when performing display in the second display mode, the control unit writes the first image in the display panel and then selectively turns on the plurality of first light sources based on the correction signal after a first standby period elapses, in the first display period.

(5) In addition to any one of (1) to (4), the display device may be configured such that, when performing display in the second display mode, the control unit writes the second image in the display panel and then turns on at least the second light source after a second standby period elapses, in the second display period.

(6) In addition to any one of (1) to (5), the display device may be configured such that the control unit sets a ratio of the first display period occupying the unit display period to be equal to a ratio of the second display period.

(7) In addition to any one of (1) to (5), the display device may be configured such that the control unit sets a ratio of the first display period occupying the unit display period to be higher than a ratio of the second display period.

(8) In addition to any one of (1) to (7), the display device may be configured such that the first light control unit causes the first direction to match a normal direction of the first main surface, and includes at least two light blocking portions that are arranged at an interval in a third direction along both of the first main surface and a surface in the first direction and the second direction and that block light, and a light transmitting portion that is arranged between the two light blocking portions and that transmits light.

(9) In addition to any one of (1) to (8), the display device may be configured such that the plurality of first light sources are arranged side by side at an interval within the first main surface.

(10) In addition to any one of (1) to (9), the display device may be configured such that the second light control unit is a light guide plate including a second main surface and a third main surface parallel to the first main surface, at least a part of an outer circumferential end surface of the light guide plate is a first end surface that faces the second light source and receives incidence of light, the second main surface emits light, and the third main surface is arranged facing the first light control unit, the second light source is arranged side by side with the light guide plate in a third direction along both the first main surface and a surface in the first direction and the second direction, and the third main surface is provided with a lens including an inclined surface with an inclination rising from a side opposite to the second light source in the third direction toward the second light source.

According to the technique described in the present specification, display quality can be improved.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIGS. 1 to 17. In the present embodiment, a liquid crystal display device (display device) 10 is exemplified. Further, some drawings illustrate an X-axis, a Y-axis, and a Z-axis, and the directions of these axes are drawn matching the directions illustrated in these drawings. Furthermore, in the vertical direction in FIG. 2 and FIG. 3, the upper side of the drawings is assumed to be the front side, and the lower side of the drawings is assumed to be the back side.

Figure 1:
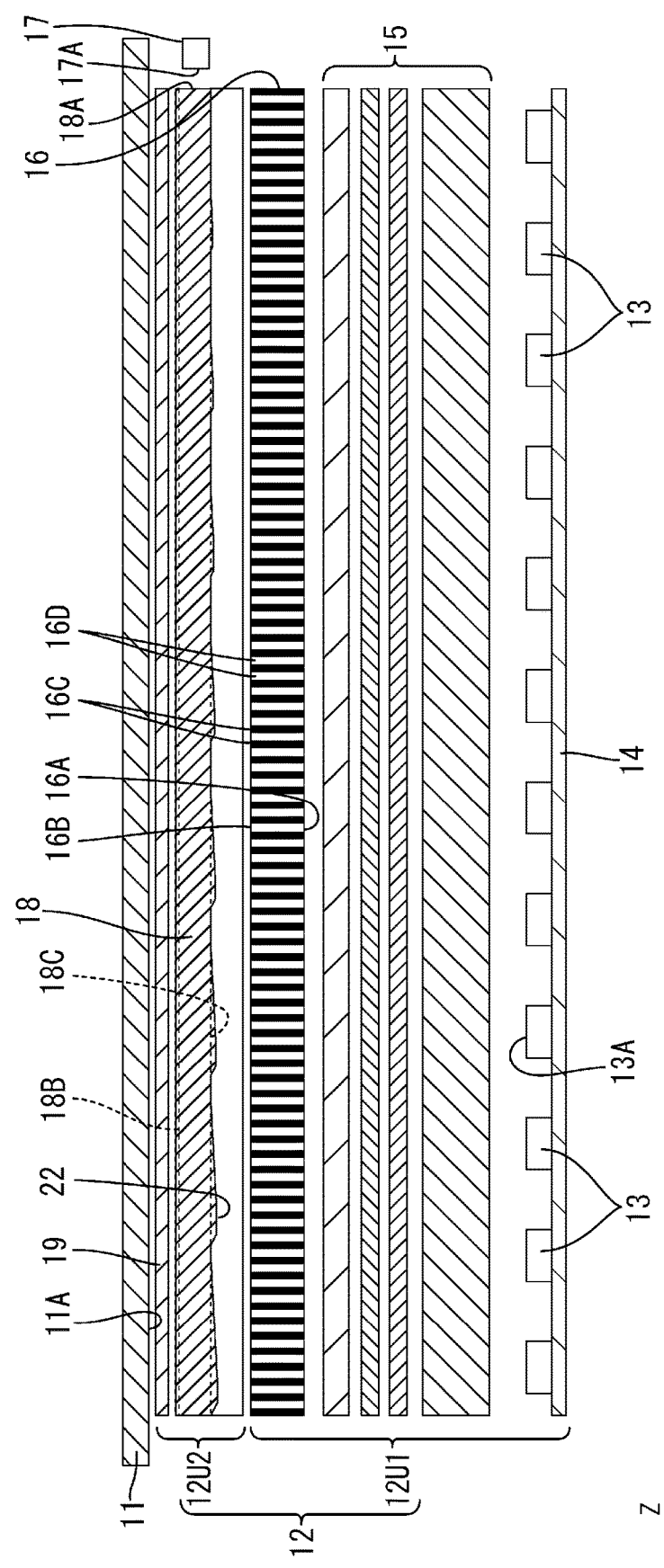
FIG. 1 is a side cross-sectional view of a liquid crystal display device according to a first embodiment.

As illustrated in FIG. 1, the liquid crystal display device 10 includes a liquid crystal panel (display panel) 11 that displays an image, and a backlight device (illumination device) 12 that is arranged on the back side of the liquid crystal panel 11 and irradiates the liquid crystal panel 11 with light to be used for display. In the present embodiment, the liquid crystal display device 10 for vehicle application is exemplified. For example, the liquid crystal display device 10 for vehicle application is mounted on a car navigation system displaying a map and the like as an image, a multi-function display displaying an operation situation and the like of equipment such as an air conditioner in addition to a map and the like as an image, an instrument panel displaying gauges, alerts, and the like as an image, and an infotainment system displaying television images, audio information, and the like in addition to a map and the like as an image.

The liquid crystal panel 11 has a plate shape in which main surfaces are parallel to the X-axis direction and the Y-axis direction, and a normal direction (thickness direction) of the pair of main surfaces matches the Z-axis direction as illustrated in FIG. 1. The main surface on the back side among the pair of main surfaces of the liquid crystal panel 11 is set as a first main surface 11A which faces the backlight device 12 and on which light from the backlight device 12 is incident. The portion at the center of the main surfaces (including the first main surface 11A) of the liquid crystal panel 11 is a display region in which images can be displayed, and the portion on the frame-shaped outer edge surrounding the display region is a non-display region. The liquid crystal panel 11 includes a pair of substrates and a liquid crystal layer sealed between the pair of substrates. Among the pair of substrates constituting the liquid crystal panel 11, the one arranged on the front side is a CF substrate (counter substrate), and the one arranged on the back side is an array substrate (TFT substrate). Color filters that exhibit red (R), green (G), blue (B), and the like, a light blocking portion (black matrix) that partitions adjacent color filters, and the like are provided on the CF substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Further, an alignment film is provided on each inner surface of the array substrate and the CF substrate constituting the liquid crystal panel 11. Furthermore, a polarizer is attached to each outer surface of the array substrate and the CF substrate constituting the liquid crystal panel 11.

Next, the backlight device 12 will be described. As illustrated in FIG. 1, the backlight device 12 includes at least a plurality of first LEDs (first light sources) 13, an LED substrate 14 on which the plurality of first LEDs 13 are provided, and a plurality of optical members 15 that impart optical effects to light emitted from the first LEDs 13. The plurality of first LEDs 13, the LED substrate 14, and the plurality of optical members 15 constitute a first backlight unit 12U1. The first backlight unit 12U1 is a so-called direct-lit backlight.

Figure 2:
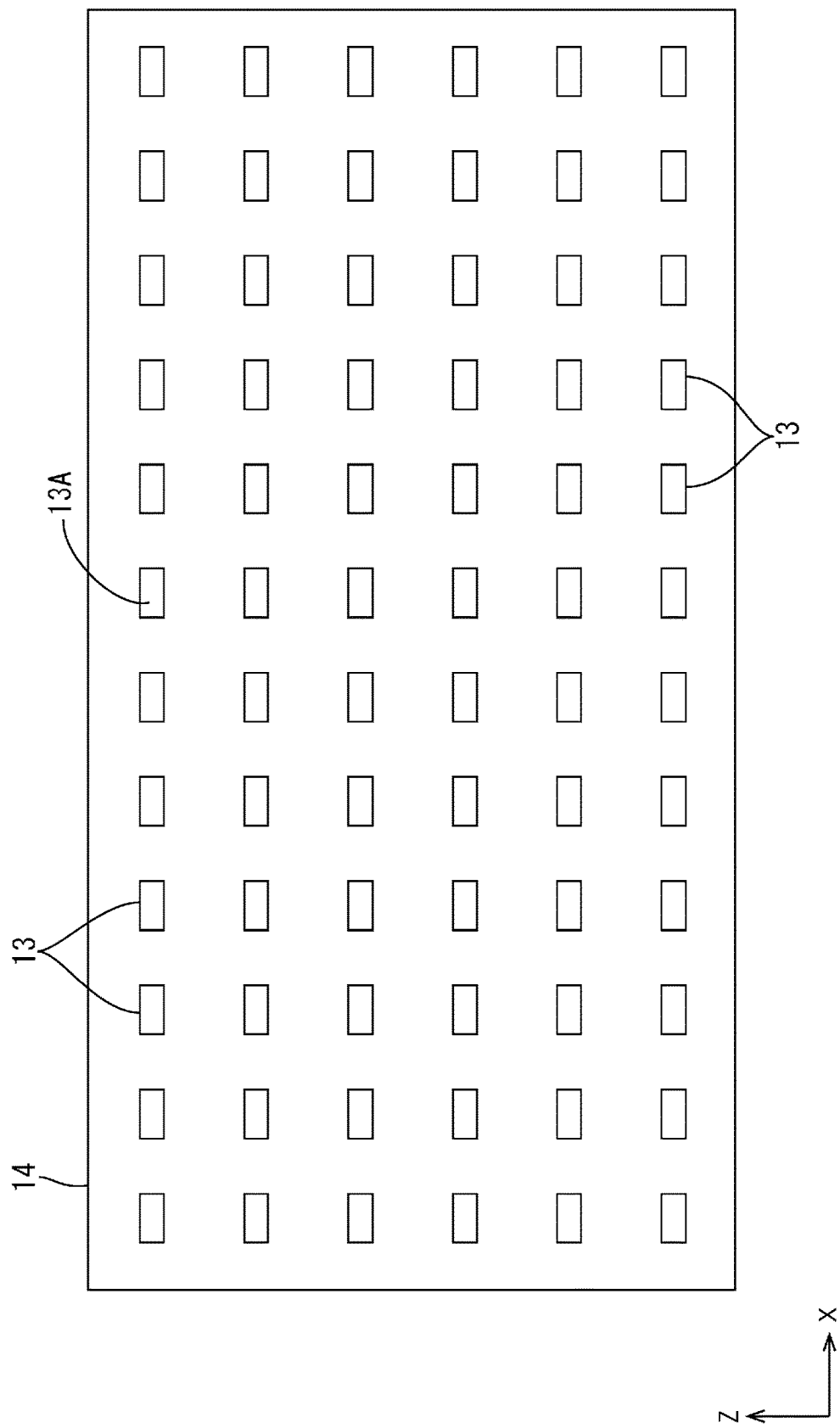
FIG. 2 is a plan view of an LED substrate according to the first embodiment.

The first LEDs 13 are mounted on the main surface of the LED substrate 14 as illustrated in FIGS. 1 and 2. Each of the first LEDs 13 has a first light emitting surface 13A that emits light. The first LEDs 13 are of the so-called top emission type in which the first light emitting surface 13A faces the side opposite to the LED substrate 14. The first light emitting surfaces 13A of the first LEDs 13 face the main surface of the optical members 15. The optical axis of the first LEDs 13 matches the Z-axis direction. The term "optical axis" mentioned here refers to an axis that matches the traveling direction of light having the highest (peak) light emission intensity among the emitted light of the first LEDs 13. White LEDs that emit white light can be used as the first LEDs 13. White LEDs are configured with LED chips sealed with a sealing material on a substrate portion mounted on the LED substrate 14. The LED chips provided in the white LEDs emit light of a single color, for example, blue light. A phosphor is dispersed and mixed in the sealing material provided in the white LEDs. The phosphor contained in the sealing material includes a yellow phosphor, a green phosphor, a red phosphor, and the like. In addition, as the first LEDs 13, blue LEDs that emit monochromatic blue light can also be used. Blue LEDs include LED chips that emit light of single color such as blue light, and the sealing material thereof does not contain a phosphor. When blue LEDs are used as the first LEDs 13, a wavelength conversion sheet may be included in the optical members 15 that will be described later.

The LED substrate 14 on which the first LEDs 13 are provided is arranged in a posture in which the main surface thereof is parallel to the first main surface 11A of the liquid crystal panel 11 as illustrated in FIGS. 1 and 2. The main surface facing the front side among the pair of main surfaces of the LED substrate 14 is a mounting surface on which the plurality of first LEDs 13 are mounted. The plurality of first LEDs 13 are arranged side by side in a matrix shape at positions at which the first LEDs 13 are spaced apart from each other in the X-axis direction and the Y-axis direction within the main surface (mounting surface) of the LED substrate 14. The plurality of first LEDs 13 are arranged side by side at intervals within the first main surface 11A of the liquid crystal panel 11. The first LEDs 13 may be called "mini LEDs", and in that case, the dimension of the outer shape thereof in a plan view is, for example, about 50 μm to 200 μm. When mini LEDs are used as the first LEDs 13, the interval between adjacent first LEDs 13 is, for example, about several mm.

As illustrated in FIG. 1, the optical members 15 have a main surface in a plate shape or a sheet shape parallel to each of the main surfaces of the liquid crystal panel 11 and the LED substrate 14. The optical members 15 are arranged at positions spaced apart from the first LEDs 13 on the front side in the Z-axis direction. The optical members 15 have functions of emitting light emitted from the first LEDs 13 toward the liquid crystal panel 11 while imparting predetermined optical effects to the light. Four optical members 15 are stacked on each other. The four optical members 15 include a diffuser plate, a prism sheet, a diffuser sheet, a wavelength conversion sheet, and the like.

Among the four optical members 15, for example, a diffuser plate can be used as the optical member 15 positioned the most behind. The diffuser plate has a configuration in which a large number of diffusion particles are dispersed in a base material made of a substantially transparent resin, which is thicker than other optical sheets, and has a function of diffusing transmitted light. The main surface on the back side of the diffuser plate faces the first light emitting surfaces 13A of the first LEDs 13. In the case where blue LEDs are used as the first LEDs 13, for example, a wavelength conversion sheet can be used as the optical member 15 positioned the most front among the four optical members 15. The wavelength conversion sheet contains a phosphor that emits secondary light when excited by blue light (primary light) from the first LEDs 13 being blue LEDs. The phosphors include a green phosphor that emits green light as secondary light and a red phosphor that emits red light as secondary light. The green phosphor and the red phosphor are of a down-conversion type (down-shifting type) in which the excitation wavelength is shorter than the fluorescence wavelength, and may be, for example, a quantum dot phosphor. Since light emitted from the wavelength conversion sheet includes blue light from the first LEDs 13 and green and red light wavelength-converted by the green and red phosphors, the emitted light exhibits a substantially white color by additive color mixing. In addition, in the case where white LEDs are used as the first LEDs 13, for example, a diffuser sheet, a reflective polarizing sheet, or the like can be used as the optical member 15 positioned the most front among the four optical members 15. Among the four optical members 15, the two optical members 15 interposed between the optical member 15 positioned the most behind and the optical member 15 positioned the most front are, for example, prism sheets, microlens sheets, or the like. Although both of the two optical members 15 may be prism sheets or microlens sheets, one optical member 15 may be a prism sheet and the other optical member 15 may be a microlens sheet.

Herein, the liquid crystal display device 10 for vehicle application may be located and installed in front of the front passenger seat of a passenger car, for example. In that case, for example, while the passenger car is traveling, it may be required to restrict a viewing angle such that, while a display image of the liquid crystal display device 10 can be visually recognized from the front passenger seat, the display image of the liquid crystal display device 10 cannot be visually recognized from the driver's seat. Furthermore, for example, while the passenger car is stopped, it may be required to not restrict the viewing angle such that a display image of the liquid crystal display device 10 can be visually recognized from both the front passenger seat and the driver's seat. Further, the liquid crystal display device 10 for vehicle application is installed in a posture in which the X-axis direction substantially matches the horizontal direction and the Y-axis direction is parallel to the vertical direction. To respond to such a request, the backlight device 12 according to the present embodiment includes at least a louver (first light control unit) 16 arranged on the front side of the optical member 15 positioned the most front, a second LED (second light source) 17, and a light guide plate (second light control unit) 18 arranged on the front side of the louver 16 as illustrated in FIG. 1, in addition to each of the configurations described above. Among these, the second LEDs 17 and the light guide plate 18 constitute a second backlight unit 12U2. The second backlight unit 12U2 is a so-called edge-lit backlight. Further, the louver 16 is included in the first backlight unit 12U1 described above. In addition, the backlight device 12 according to the present embodiment includes a diffuser sheet 19 that is arranged on the front side of the light guide plate 18 and diffuses light.

A configuration of the louver 16 will be described with reference to FIGS. 1 and 3. The louver 16 has the main surface having a sheet shape parallel to the first main surface 11A of the liquid crystal panel 11 as illustrated in FIG. 1. Further, the main surface of the louver 16 is parallel to the X-axis direction and the Y-axis direction, and the normal direction (thickness direction) of the main surface matches the Z-axis direction. The louver 16 has a function of restricting an emission angle range of light in the X-axis direction. The louver 16 includes a first light entering main surface 16A on the back side and a first light emission main surface 16B on the front side. The first light entering main surface 16A faces the main surface of the optical member 15 on the front side (light emission side) positioned the most front. The first light emission main surface 16B faces a third main surface 18C of the light guide plate 18 described below.

Figure 3:
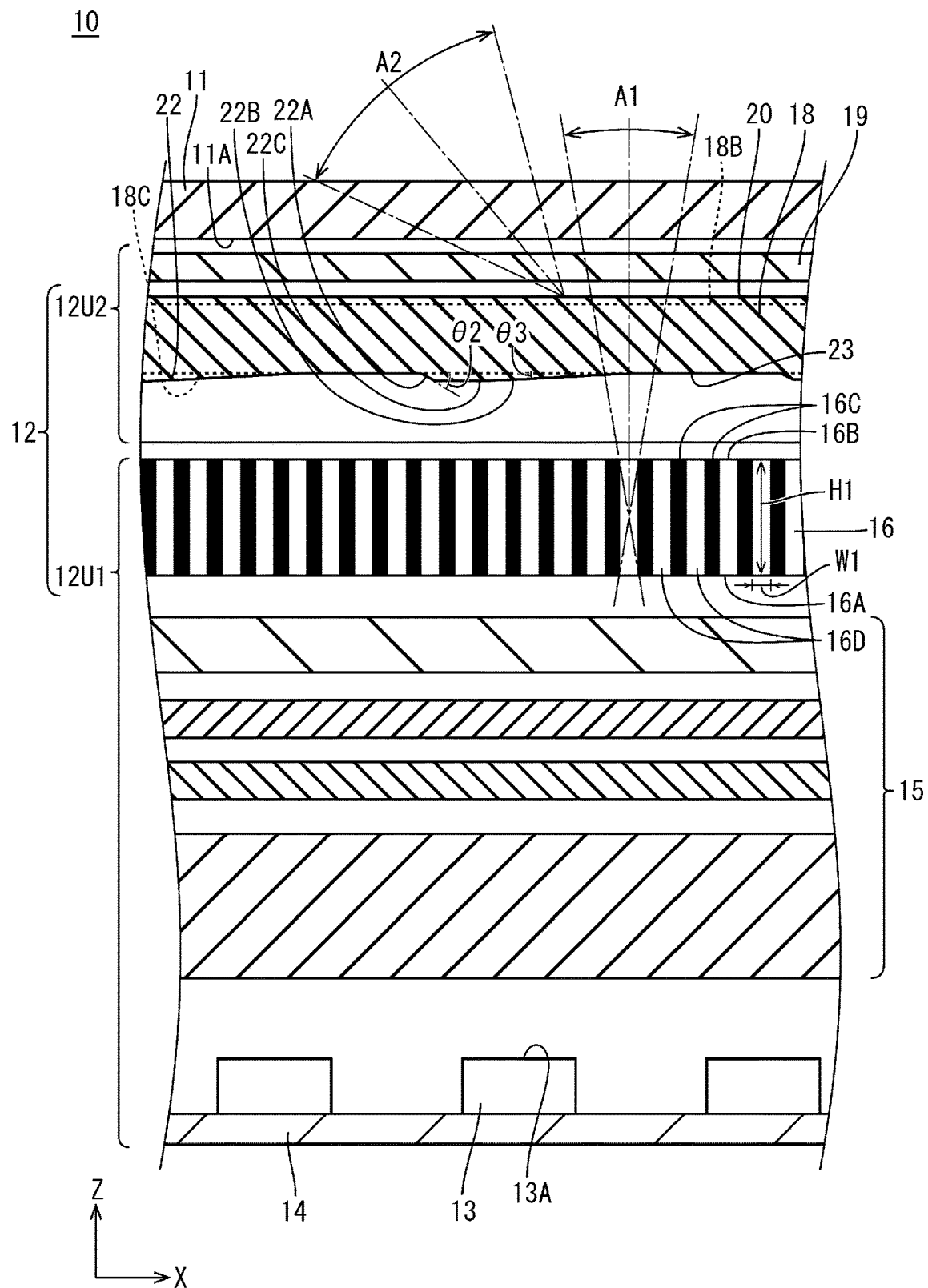
FIG. 3 is a side cross-sectional view of a backlight device provided in the liquid crystal display device according to the first embodiment.

As illustrated in FIG. 3, the louver 16 includes light blocking portions 16C that block light and light transmitting portions 16D that transmit light. The light blocking portions 16C are formed of, for example, a light blocking resin material (light blocking material) that exhibits a black color and blocks light. The light blocking portions 16C have a layer shape extending in the Y-axis direction and the Z-axis direction, and a plurality of the light blocking portions 16C are arranged side by side at intervals in the X-axis direction (third direction). The light transmitting portions 16D are formed of a light-transmissive resin material (light-transmissive material) that is substantially transparent and transmits light. The light transmitting portions 16D have a layer shape extending in the Y-axis direction and the Z-axis direction, and a plurality of the light transmitting portions 16D are arranged side by side at intervals in the X-axis direction. The plurality of light blocking portions 16C and light transmitting portions 16D are arranged alternately and repeatedly side by side in the X-axis direction. Therefore, each light transmitting portion 16D is interposed between two light blocking portions 16C that are adjacent to each other at an interval in the X-axis direction, and each light blocking portion 16C is interposed between two light transmitting portions 16D that are adjacent to each other at an interval in the X-axis direction. Light incident on the first light entering main surface 16A of the louver 16 is transmitted through the light transmitting portions 16D each arranged between two light blocking portions 16C that are adjacent to each other in the X-axis direction, and is emitted from the first light emission main surface 16B. Light emitted from the first light emission main surface 16B is regulated (restricted) by the two light blocking portions 16C adjacent to each other in the X-axis direction to fall within a first angle range A1 with respect to the Z-axis direction (first direction) which is the normal direction of the first light emission main surface 16B (first main surface 11A) in the X-axis direction. The Z-axis direction which is the center of the first angle range A1 has an angle of 90° with respect to the first main surface 11A. Further, light emitted from the first light emission main surface 16B is not regulated by the louver 16 with respect to an emission angle in the Y-axis direction. The first angle range A1 is defined by two straight lines diagonally connecting in the Z-axis direction ends of two light blocking portions 16C sandwiching a light transmitting portion 16D. The first angle range A1 changes according to the ratio between a width W1 and a height H1 of the light transmitting portion 16D. Furthermore, the louver 16 includes a pair of sheet carriers that sandwich and carry the plurality of light blocking portions 16C and light transmitting portions 16D from the front side and the back side. The sheet carrier is formed of a light-transmissive resin material that is substantially transparent and transmits light. The sheet carrier extends all over the louver 16, and collectively holds the plurality of light blocking portions 16C and light transmitting portions 16D.

Specifically, the louver 16 has a ratio acquired by dividing the width W1 of the light transmitting portion 16D by the height H1 equal to "tan 10°" as illustrated in FIG. 3. In this way, the absolute value of the maximum angle formed by light transmitted through the light transmitting portion 16D with respect to the Z-axis direction is 10°. In this case, when the Z-axis direction is 0°, the first angle range A1 is, for example, about ±10°. As compared to when a ratio acquired by dividing a width of the light transmitting portion 16D by a height is greater than "tan 10°", the emission angle range of light emitted from the backlight device 12 is sufficiently narrowed. In this way, this embodiment is suitable for restricting a viewing angle such that, while a display image of the liquid crystal display device 10 can be visually recognized from the front passenger seat, the display image of the liquid crystal display device 10 cannot be visually recognized from the driver's seat. Furthermore, as compared to when a ratio acquired by dividing the width of the light transmitting portion 16D by the height is smaller than "tan 10°", the amount of light blocked by the light blocking portions 16C decreases, and light use efficiency is improved.

Figure 5:
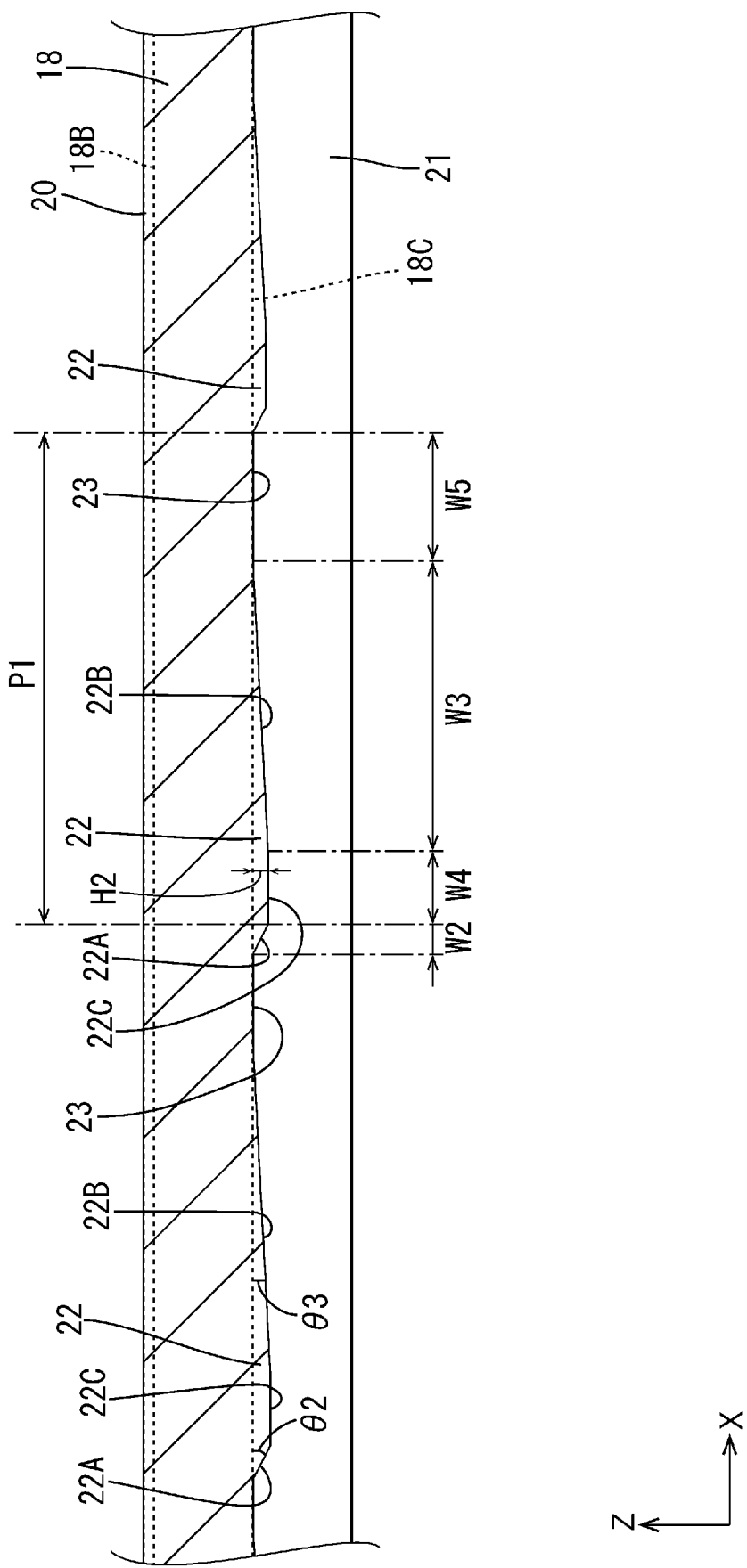
FIG. 5 is a side cross-sectional view of a light guide plate constituting the backlight device according to the first embodiment.
Figure 6:
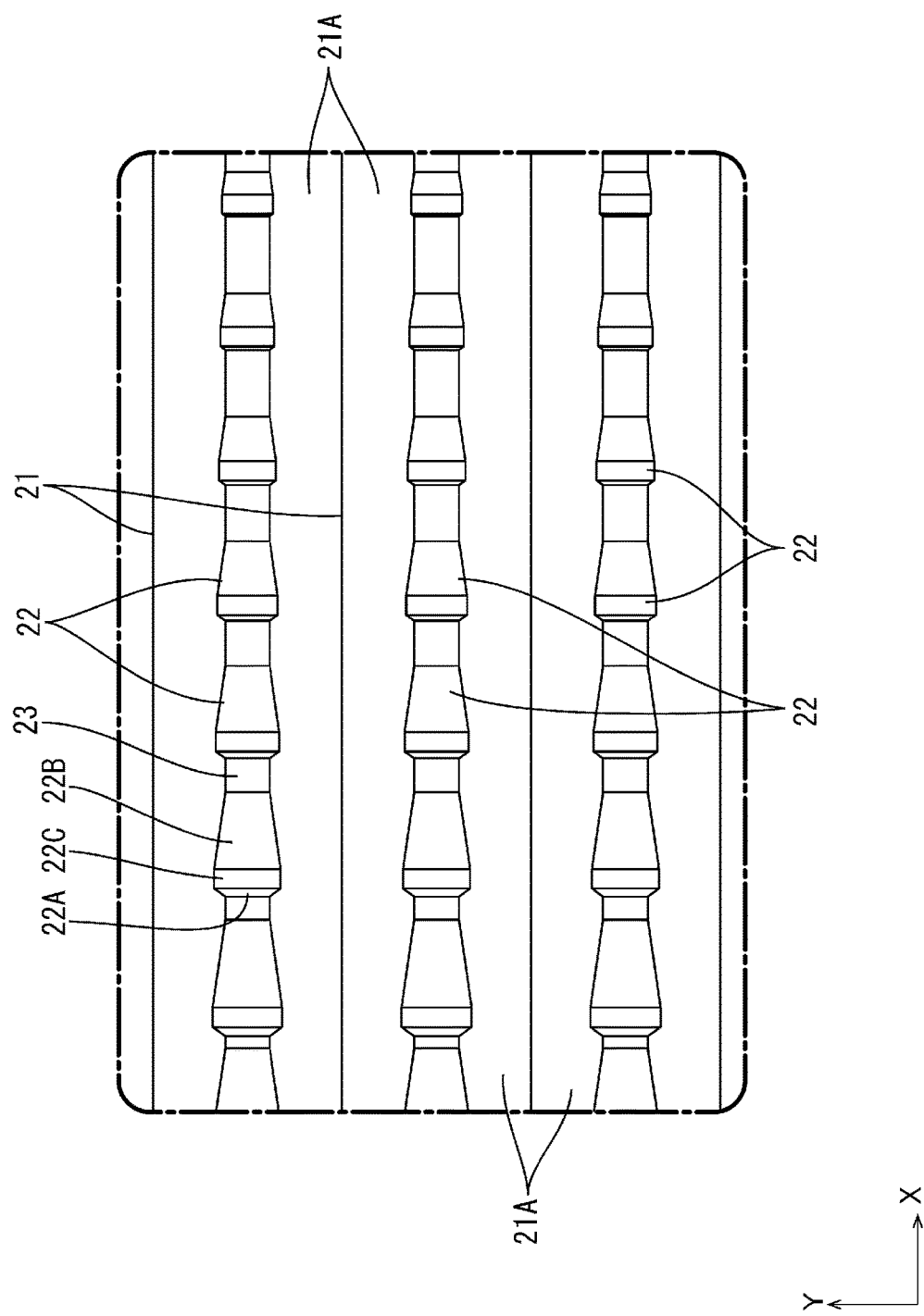
FIG. 6 is a bottom view illustrating a configuration of a third main surface of the light guide plate according to the first embodiment.

A configuration of the second LEDs 17 and the light guide plate 18 will be described by appropriately using FIG. 1 and FIGS. 3 to 6. FIG. 5 is an enlarged cross-sectional view of the light guide plate 18 among constituent components of the backlight device 12. FIG. 6 is a bottom view illustrating the main surface of the light guide plate 18 on the back side. The second LEDs 17 each are substantially block-shaped as illustrated in FIG. 1, and one surface of a pair of surfaces in the Y-axis direction and the Z-axis direction is set as a second light emitting surface 17A that emits light. A plurality of the second LEDs 17 are arranged side by side at intervals in the Y-axis direction. The second LEDs 17 are mounted on an LED substrate. The second LEDs 17 have a configuration in which an LED chip is sealed with a sealing material on a substrate portion mounted on the LED substrate. The LED chip provided in the second LED 17 emits light of a single color, for example, blue light. A phosphor is dispersed and mixed in the sealing material provided in the second LEDs 17. The phosphor contained in the sealing material includes a yellow phosphor, a green phosphor, a red phosphor, and the like. The second LEDs 17 including such an LED chip and such a sealing material emit white light as a whole.

The light guide plate 18 is made of a synthetic resin material (for example, an acrylic resin such as PMMA) that has a sufficiently higher refractive index than that of air and that is substantially transparent. The light guide plate 18 has a plate shape as illustrated in FIG. 1, and a pair of main surfaces thereof are parallel to the first main surface 11A of the liquid crystal panel 11. Further, the main surfaces of the light guide plate 18 are parallel to the X-axis direction and the Y-axis direction, and the normal direction (thickness direction) of the main surface matches the Z-axis direction. The light guide plate 18 is aligned along with the second LEDs 17 in the X-axis direction, and is also arranged side by side with the liquid crystal panel 11, the louver 16, and the like in the Z-axis direction.

One end surface of the outer circumferential end surfaces of the light guide plate 18 is set as a first end surface 18A facing the second light emitting surface 17A of the second LED 17 as illustrated in FIG. 1. The first end surface 18A is a surface parallel to the second light emitting surface 17A of the second LED 17, and light emitted from the second light emitting surface 17A is incident on the first end surface 18A. Therefore, it can be said that the second LED 17 is arranged only on one side of the light guide plate 18 in the X-axis direction, and the light guide plate 18, together with the second LED 17, constitutes a second backlight unit 12U2 that is of a single-side light entering type. The main surface among the pair of main surfaces of the light guide plate 18 on the front side facing the diffuser sheet 19 is set as a second main surface (light emission main surface) 18B that emits light guided through the inside of the light guide plate 18. The main surface among the pair of main surfaces of the light guide plate 18 on the back side facing the louver 16 is set as a third main surface (light emission-opposing main surface) 18C positioned on the side opposite to the second main surface 18B. In the light guide plate 18, the third main surface 18C is arranged facing the first light emission main surface 16B of the louver 16 in the Z-axis direction. Then, the light guide plate 18 can introduce light emitted from the second LED 17 toward the light guide plate 18 from the first end surface 18A, and after letting the light propagate therein, can launch and emit the light toward the liquid crystal panel 11 on the front side (light emission side) from the second main surface 18B in the Z-axis direction. In addition to that, the light guide plate 18 can introduce, from the third main surface 18C, emission light from the louver 16, and can also emit the light from the second main surface 18B toward the liquid crystal panel 11 on the front side. Further, the normal direction of the first end surface 18A matches the X-axis direction (the direction in which the second LED 17 aligns with the light guide plate 18).

Figure 4:
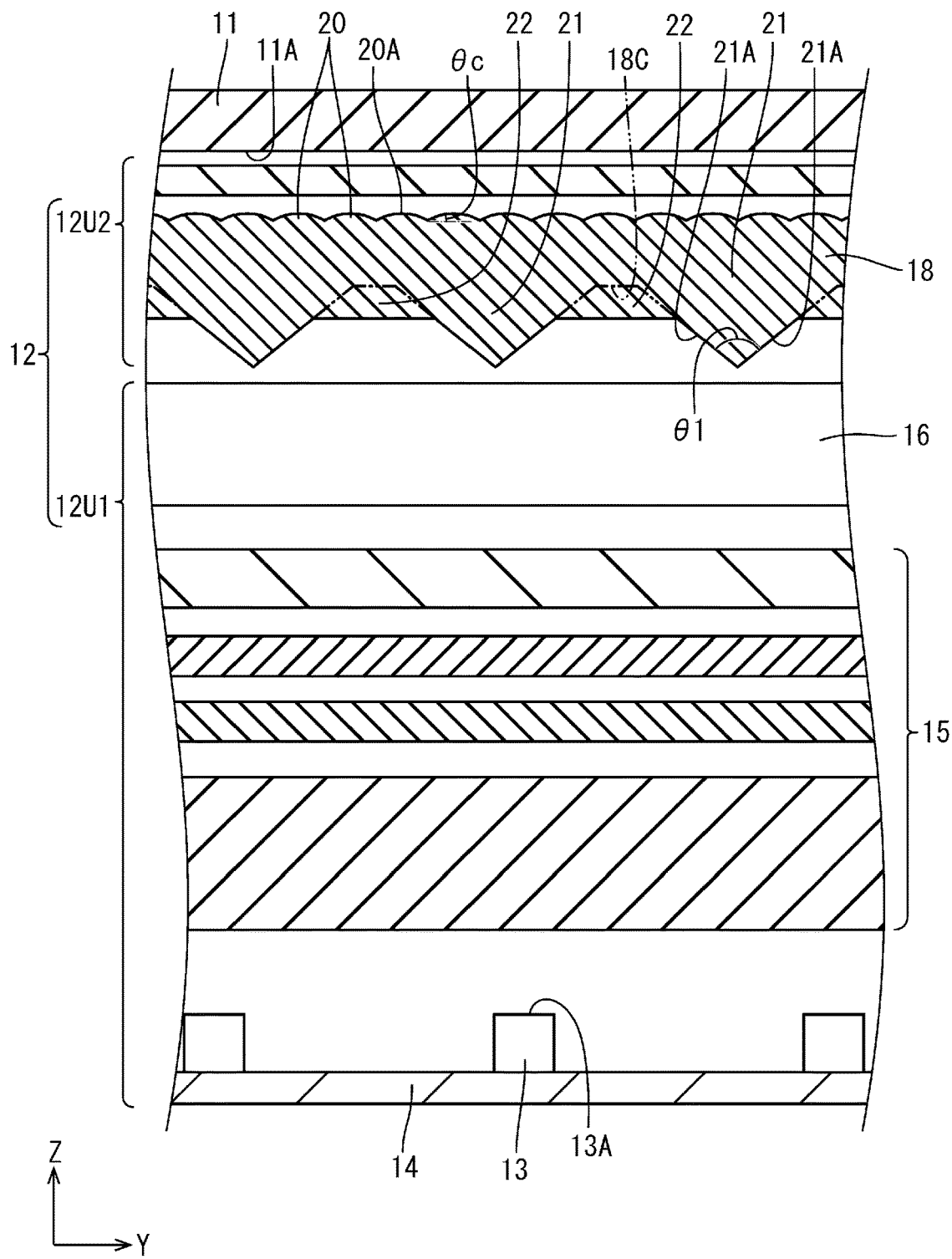
FIG. 4 is a front cross-sectional view of the backlight device according to the first embodiment.

First lenses 20, second lenses 21, and third lenses (lens) 22 are provided on the light guide plate 18 as illustrated in FIGS. 3 and 4. The first lenses 20 are provided on the second main surface 18B of the light guide plate 18 as illustrated in FIG. 4. A plurality of first lenses 20 extend in the X-axis direction, and are arranged side by side in the Y-axis direction. In the present embodiment, the first lenses 20 are so-called lenticular lenses. Each first lens 20 has a convex shape protruding from the second main surface 18B to the front side. Specifically, the first lens 20 has a semi-circular shape in a cross section taken in the Y-axis direction and a semi-cylindrical shape linearly extending in the X-axis direction, and a surface of the first lens 20 is set as a circular arc-shaped surface 20A. When an angle formed by a tangent line at the base end of the circular arc-shaped surface 20A with respect to the Y-axis direction is defined as a "contact angle", a contact angle θc of the first lens 20 is, for example, approximately 30°. The plurality of first lenses 20 aligned along the Y-axis direction have substantially the same contact angle θc, substantially the same width dimension (arrangement interval), and substantially the same height dimension. In order to integrally provide the light guide plate 18 with the first lenses 20 having such a configuration, for example, the light guide plate 18 may be manufactured by using injection molding, and a transfer shape for transferring the first lenses 20 may be formed in advance on the molding surface of a molding die for molding the second main surface 18B.

The second lenses 21 are provided on the third main surface 18C of the light guide plate 18 as illustrated in FIG. 4. A plurality of second lenses 21 extend in the X-axis direction, and are arranged side by side in the Y-axis direction. In the present embodiment, the second lenses 21 are convex-shaped prisms protruding from the third main surface 18C to the back side. Specifically, the second lenses 21 have a substantially triangular shape (are substantially mountain-shaped) in a cross section taken in the Y-axis direction, and also extends linearly in the X-axis direction. The second lenses 21 have a width dimension (dimension in the Y-axis direction) that is constant throughout the entire length in the X-axis direction. Each second lens 21 has an approximately isosceles triangle cross-sectional shape and includes a pair of first inclined surfaces 21A. The apex angle θ1 of the second lens 21 is preferably set to an obtuse angle (angle greater than 90°), specifically, within a range from 1000 to 150°, and is most preferably set to 140°. The plurality of second lenses 21 aligned along the Y-axis direction have substantially the same apex angle θ1, substantially the same width dimension (arrangement interval), and substantially the same height dimension. In the present embodiment, the arrangement interval of the second lenses 21 is greater than the arrangement interval of the first lenses 20. In order to integrally provide the light guide plate 18 with the second lenses 21 having such a configuration, for example, the light guide plate 18 may be manufactured by using injection molding, and a transfer shape for transferring the second lenses 21 may be formed in advance on the molding surface of a molding die for molding the third main surface 18C.

The third lenses 22 are provided on the third main surface 18C of the light guide plate 18 as illustrated in FIG. 3. A plurality of third lenses 22 are arranged side by side at intervals in the X-axis direction. The third lenses 22 protrude from the third main surface 18C toward the back side in the Z-axis direction. Each third lens 22 includes a second inclined surface (inclined surface) 22A arranged on the side opposite to the second LED 17 side in the X-axis direction (the left side in FIG. 3), a third inclined surface 22B arranged on the second LED 17 side in the X-axis direction (the right side in FIG. 3), and a first plane 22C positioned between the second inclined surface 22A and the third inclined surface 22B. The second inclined surface 22A has an inclination rising from the second LED 17 side (the right side in FIG. 3) of the light guide plate 18 in the X-axis direction toward the side opposite to the second LED 17 side (the left side in FIG. 3). The third inclined surface 22B has an inclination rising from the side opposite to the second LED 17 side (the left side in FIG. 3) of the light guide plate 18 in the X-axis direction toward the second LED 17 side (the right side in FIG. 3). The first plane 22C is a surface parallel to the X-axis direction and the Y-axis direction.

Furthermore, a second plane 23 is provided between two third lenses 22 that are adjacent to each other in the X-axis direction. Thus, the third lenses 22 and the second plane 23 are arranged alternately and repeatedly side by side in the X-axis direction.

As illustrated in FIG. 3, the second inclined surface 22A reflects light propagating inside the light guide plate 18, raises the light toward the front side, and thus can promote emission from the second main surface 18B. Specifically, the second inclined surface 22A mainly functions to reflect and raise light traveling away from the second LED 17 in the X-axis direction inside the light guide plate 18. Specifically, the second inclined surface 22A has an inclination angle (angle) θ2 in the X-axis direction set to be, for example, equal to or smaller than 40°, and preferably set to approximately 27° as illustrated in FIG. 5. When the inclination angle θ2 of the second inclined surface 22A in the X-axis direction is set to be equal to or smaller than 40°, light can be raised in a direction (second direction) inclined to the side opposite to the second LED 17 side (the left side in FIG. 3) in the X-axis direction with respect to the normal direction (Z-axis direction) of the second main surface 18B. The light raised by the second inclined surface 22A having the inclination angle θ2 as described above is mainly emitted from the second main surface 18B to the second angle range A2 around the second direction inclined to the side opposite to the second LED 17 side in the X-axis direction with respect to the Z-axis direction. The second direction which is the center of the second angle range A2 has an angle (for example, 55°) that is different from 90° with respect to the first main surface 11A. The second direction which is the center of the second angle range A2 has an angle of, for example, about 35° in the Z-axis direction. Therefore, when the second LED 17 is turned on, emission light having a luminance angle distribution in which peak luminance of the emission light is biased toward the side opposite to the second LED 17 side in the X-axis direction can be supplied, and thus light can be efficiently emitted to the second angle range A2 around the second direction. In the liquid crystal display device 10 for vehicle application installed in front of the front passenger seat of a passenger car, the second LED 17 is preferably arranged on the side opposite to the driver's seat side in the X-axis direction.

According to this configuration, for example, while a passenger car travels, the first LEDs 13 are turned on and the second LED 17 is left unlit as illustrated in FIG. 1. Then, for light emitted from the second main surface 18B of the light guide plate 18, the angle range in which light can be emitted is regulated by the two light blocking portions 16C of the louver 16 in the X-axis direction, and thus it is difficult to emit light outside the regulated first angle range A1. Therefore, when the first LEDs 13 are turned on and the second LED 17 is turned off, light is selectively emitted from the backlight device 12 in the restricted angle range, and thus while a display image of the liquid crystal display device 10 can be visually recognized from the front passenger seat, the display image of the liquid crystal display device 10 cannot be visually recognized from the driver's seat. Further, the X-axis direction (third direction) which is the arrangement direction of the plurality of light blocking portions 16C is a direction along both the first main surface 11A and a surface in the Z-axis direction and the second direction (a surface in the X-axis direction and the Z-axis direction).

In contrast, for example, while a passenger car is stopped, both the first LEDs 13 and the second LED 17 are turned on. Then, the light emitted from the second main surface 18B of the light guide plate 18 includes light of the first LEDs 13 emitted mainly by the louver 16 in the first angle range A1 around the Z-axis direction and light of the second LED 17 emitted mainly by the third lenses 22 mainly in the second angle range A2 around the second direction different from the Z-axis direction. Therefore, when both the first LEDs 13 and the second LED 17 are turned on, the backlight device 12 emits light of the second angle range A2 having the luminance angle distribution in which the peak luminance is biased toward the side opposite to the second LED 17 side in the X-axis direction, in addition to light of the first angle range A1, and thus, a display image of the liquid crystal display device 10 can be visually recognized from both the driver's seat and the front passenger seat. In this way, whether a display image can be visually recognized from the driver's seat can be adjusted by controlling driving of the first LEDs 13 and the second LED 17 according to a traveling situation of the passenger car. Control of driving of the first LEDs 13 and the second LED 17 will be described in detail later.

Meanwhile, the third inclined surface 22B can reflect and raise light traveling toward the second LED 17 in the X-axis direction, and can reflect light traveling away from the second LED 17 in the X-axis direction inside the light guide plate 18 and guide the light to go farther away from the second LED 17 as illustrated in FIG. 3. Specifically, the third inclined surface 22B has an inclination angle (angle) θ3 in the X-axis direction set, for example, in a range from 3° to 10°, and preferably set to approximately 3° as illustrated in FIG. 5. The inclination angle θ3 of the third inclined surface 22B is smaller than the inclination angle θ2 of the second inclined surface 22A. According to the third inclined surface 22B having such a configuration, when light traveling toward the second LED 17 in the X-axis direction inside the light guide plate 18 is incident on the third inclined surface 22B and refracted, the light travels to the side opposite to the second LED 17 side in the X-axis direction with respect to the Z-axis direction. In this way, luminance of emission light in the second angle range A2 around the second direction can be further improved. Furthermore, when light traveling away from the second LED 17 in the X-axis direction inside the light guide plate 18 is incident on the third inclined surface 22B and refracted, the light is guided to go farther away from the second LED 17. Accordingly, emission light from the second main surface 18B is less likely to be biased toward the second LED 17 side in the X-axis direction.

The first plane 22C and the second plane 23 are parallel to the X-axis direction and the Y-axis direction, and the normal direction of the first plane 22C and the second plane 23 matches the Z-axis direction as illustrated in FIG. 3. Light emitted from the first light emission main surface 16B of the louver 16 and incident on the third main surface 18C of the light guide plate 18 travels almost unrefracted even when the light is incident on any of the first plane 22C and the second plane 23. Therefore, as compared to a configuration in which the second inclined surface 22A and the third inclined surface 22B are directly connected without having the first plane 22C interposed therebetween, and a configuration in which two third lenses 22 that are adjacent to each other in the X-axis direction are directly connected without having the second plane 23 interposed therebetween, the occurrence of side lobe light traveling in a direction inclined to the side opposite to the second LED 17 side in the X-axis direction with respect to the Z-axis direction can be curbed.

As illustrated in FIGS. 5 and 6, the plurality of third lenses 22 aligned along the X-axis direction are designed such that a height dimension (dimension in the Z-axis direction) H2 increases as the third lenses go away from the second LED 17 in the X-axis direction, but an arrangement pitch (arrangement interval) P1 of the third lenses in the X-axis direction is constant. A width dimension (dimension in the X-axis direction) W2 of the second inclined surface 22A slightly increases as the second inclined surface goes away from the second LED 17 in the X-axis direction. A width dimension (dimension in the X-axis direction) W3 of the third inclined surface 22B increases as the third inclined surface goes away from the second LED 17 in the X-axis direction, and an increase rate of the width dimension W3 is higher than an increase rate of the second inclined surface 22A. A width dimension (dimension in the X-axis direction) W4 of the first plane 22C is set constant regardless of a position in the first plane in the X-axis direction. A width dimension (dimension in the X-axis direction) W5 of the second plane 23 decreases as the second plane goes away from the second LED 17 in the X-axis direction. The arrangement pitch P1 of the third lenses 22 in the X-axis direction is the sum of the width dimension W2 of the second inclined surface 22A, the width dimension W3 of the third inclined surface 22B, the width dimension W4 of the first plane 22C, and the width dimension W5 of the second plane 23.

When a length dimension (dimension in the X-axis direction) of the light guide plate 18 is set to, for example, 300 mm, the arrangement pitch P1 of the third lenses 22 in the X-axis direction is set constant at, for example, approximately 0.114 mm, and the width dimension W4 of the first plane 22C is set constant at, for example, approximately 0.017 mm. The width dimension W2 of the second inclined surface 22A tends to increase from the first end surface 18A of the light guide plate 18 toward the end surface on the side opposite to the first end surface 18A in the X-axis direction. The minimum value of the width dimension W2 of the second inclined surface 22A is, for example, about 0.002 mm, and the maximum value thereof is, for example, about 0.005 mm. The width dimension W3 of the third inclined surface 22B tends to increase from the first end surface 18A of the light guide plate 18 toward the end surface on the side opposite to the first end surface 18A in the X-axis direction. The increase rate of the width dimension W3 of the third inclined surface 22B is greater than the increase rate of the width dimension W2 of the second inclined surface 22A. The minimum value of the width dimension W3 of the third inclined surface 22A is, for example, about 0.038 mm, and the maximum value thereof is, for example, about 0.062 mm. The width dimension W5 of the second plane 23 tends to decrease from the first end surface 18A of the light guide plate 18 toward the end surface on the side opposite to the first end surface 18A in the X-axis direction. The maximum value of the width dimension W5 of the second plane 23 is, for example, about 0.031 mm, and the minimum value thereof is, for example, a little less than 0.005 mm. A height dimension H2 of the third lenses 22 tends to increase from the first end surface 18A of the light guide plate 18 toward the end surface on the side opposite to the first end surface 18A in the X-axis direction. The minimum value of the width dimension W2 of the second inclined surface 22A is, for example, about 0.002 mm, and the maximum value thereof is, for example, about 0.0033 mm. Since the minimum value of the height dimension H2 of the third lenses 22 is ensured to be about 0.002 mm, sufficient convenience in manufacturing of the light guide plate 18 by resin-molding can be ensured. In order to ensure the minimum value of the height dimension H2 of the third lenses 22 at approximately 0.002 mm, the inclination angle θ3 formed by the third inclined surface 22B with respect to the X-axis direction is preferably set to be equal to or greater than 3°. Further, the inclination angle θ2 of the second inclined surface 22A with respect to the X-axis direction and the inclination angle θ3 of the third inclined surface 22B with respect to the X-axis direction is set constant regardless of a position of the light guide plate 18 in the X-axis direction.

Each of the third lenses 22 having the configuration described above is arranged to be sandwiched between two second lenses 21 adjacent to each other in the Y-axis direction as illustrated in FIGS. 4 to 6. Thus, the third lenses 22 are arranged repeatedly and alternately with the second lenses 21 in the Y-axis direction. The third lenses 22 set the maximum value of the height dimension (protrusion dimension from the third main surface 18C) H2 to be smaller than that of the height dimension of the second lenses 21. Thus, even a third lens 22 positioned on the farthest side from the second LED 17 in the X-axis direction does not protrude farther toward the back side than the second lenses 21.

Figure 7:
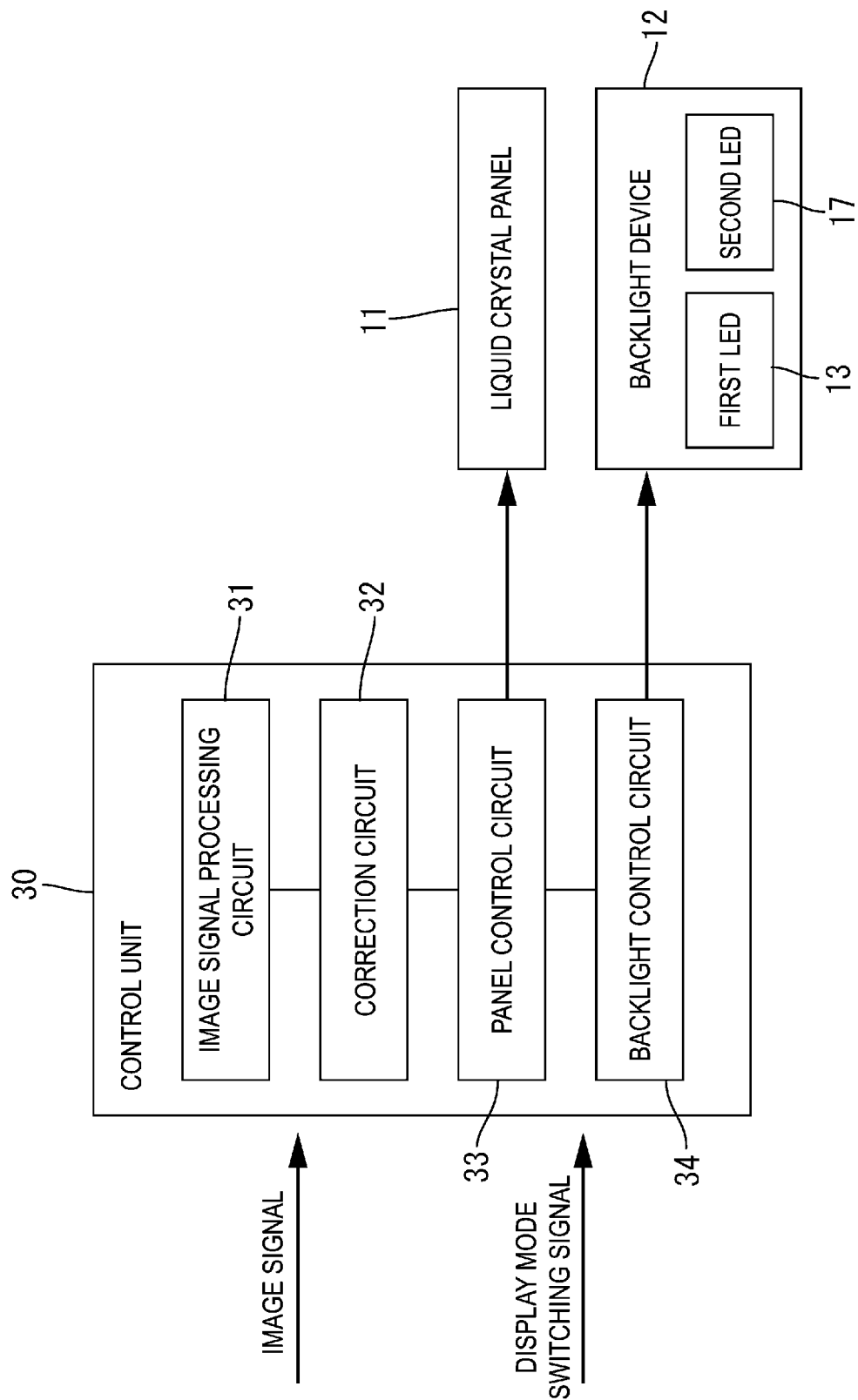
FIG. 7 is a block diagram illustrating an electrical configuration of the liquid crystal display device according to the first embodiment.

Next, a circuit configuration for controlling driving of the liquid crystal panel 11 and the backlight device 12 will be described with reference to the block diagram of FIG. 7. The liquid crystal display device 10 includes a control unit 30 that controls driving of the liquid crystal panel 11 and the backlight device 12 as illustrated in FIG. 7. The control unit 30 includes an image signal processing circuit 31, a correction circuit 32, a panel control circuit 33, and a backlight control circuit 34. The image signal processing circuit 31 processes an image signal supplied from an external host system and outputs the processed image signal. The correction circuit 32 outputs a correction signal generated by correcting the processed image signal output from the image signal processing circuit 31, or outputs the processed image signal without correction. The panel control circuit 33 writes an image based on the correction signal or the processed image signal to the liquid crystal panel 11. When the liquid crystal display device 10 includes a gate driver and a source driver for writing an image to the liquid crystal panel 11, the panel control circuit 33 controls driving of the gate driver and the source driver. The backlight control circuit 34 controls at least one of the first LEDs 13 and the second LED 17 to adjust a light emission amount or the like of at least one of the first LEDs 13 and the second LED 17. When controlling at least one of the first LEDs 13 and the second LED 17, the backlight control circuit 34 can perform, for example, pulse width modulation (PWM) dimming, or the like. When the liquid crystal display device 10 includes an LED driver that drives the first LEDs 13 and the second LED 17, the backlight control circuit 34 controls driving of the LED driver.

Figure 8:
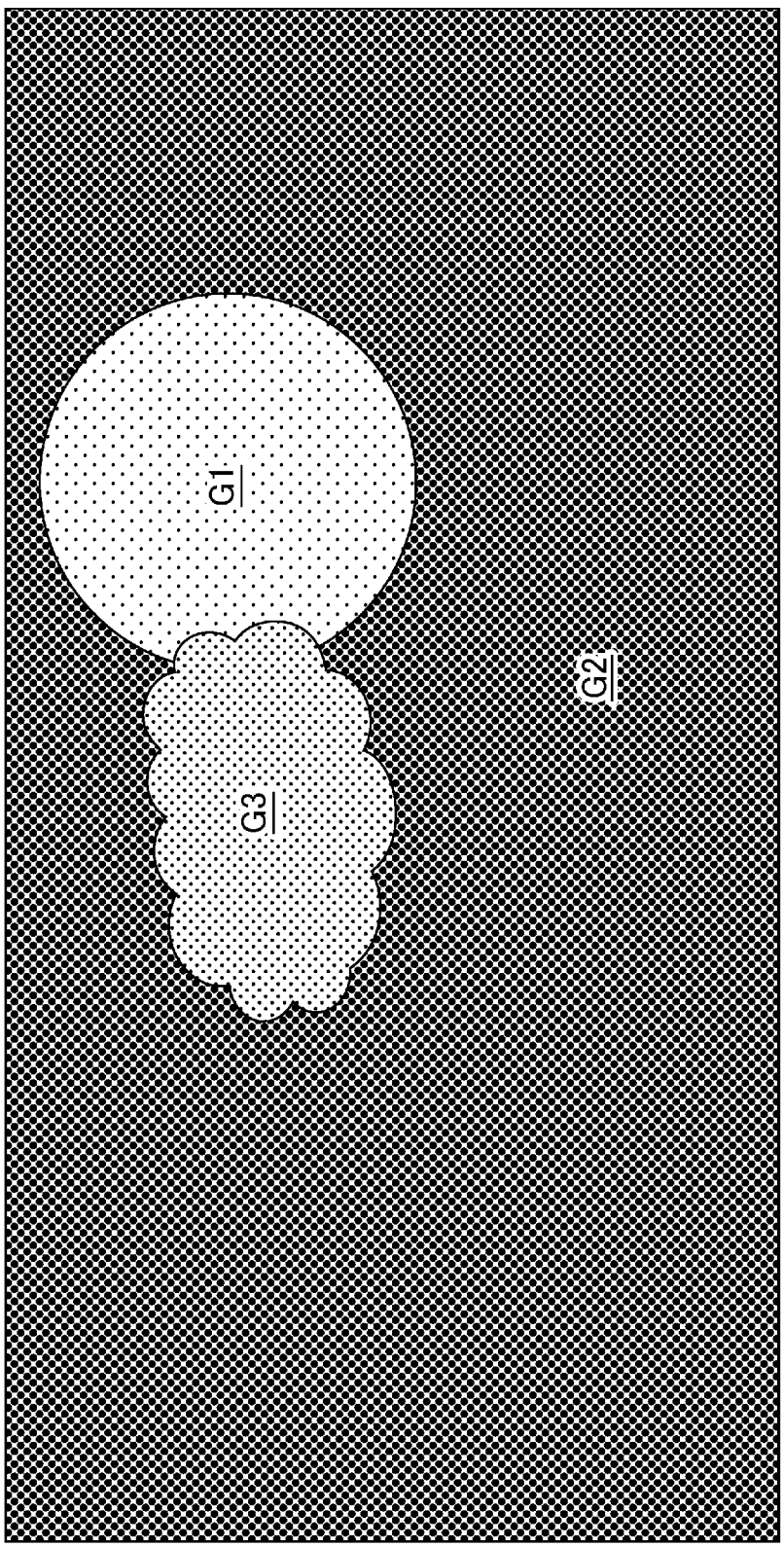
FIG. 8 is a view illustrating an image written on a liquid crystal panel according to the first embodiment.

Next, local dimming control will be described with reference to FIGS. 8 to 13. FIG. 8 illustrates an example of an image written in the liquid crystal panel 11 by the panel control circuit 33. In FIG. 8, the levels of the display grayscale are represented by shading, and the display grayscale is high (bright) in a portion where shading is light and the display grayscale is low (dark) in a portion where shading is dark. In FIG. 8, three portions having different display grayscales are illustrated, there being illustrated a first grayscale portion G1 having the highest display grayscale, a second grayscale portion G2 having the lowest display grayscale, and a third grayscale portion G3 having an intermediate display grayscale. In the present embodiment, the display grayscale of the second grayscale portion G2 is 0 grayscale. Further, each of the first grayscale portion G1, the second grayscale portion G2, and the third grayscale portion G3 has a constant grayscale.

Figure 9:
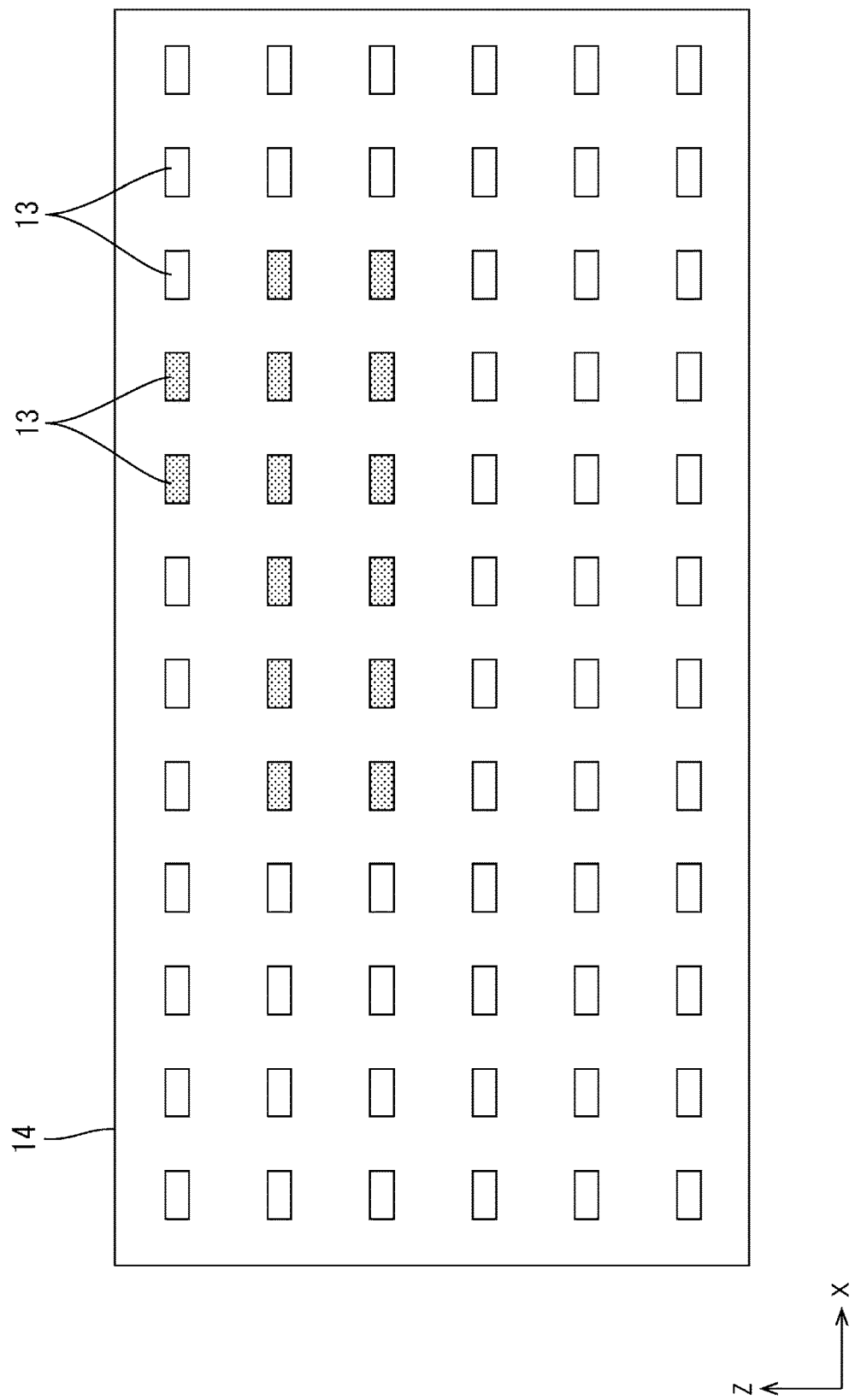
FIG. 9 is a plan view of the LED substrate according to the first embodiment in which selectively lit first LEDs are shaded.

When the image illustrated in FIG. 8 is displayed, the plurality of first LEDs 13 are selectively turned on by the backlight control circuit 34 as illustrated in FIG. 9. In FIG. 9, the lit first LEDs 13 are illustrated in a shaded manner, and the unlit first LEDs 13 are illustrated in white. Specifically, the backlight control circuit 34 selectively turns on the plurality of first LEDs 13 having a positional relationship of overlapping the first grayscale portion G1 and the third grayscale portion G3 among the plurality of first LEDs 13, and leaves a plurality of first LEDs 13 having a positional relationship of overlapping the second grayscale portion G2 unlit.

Figure 10:
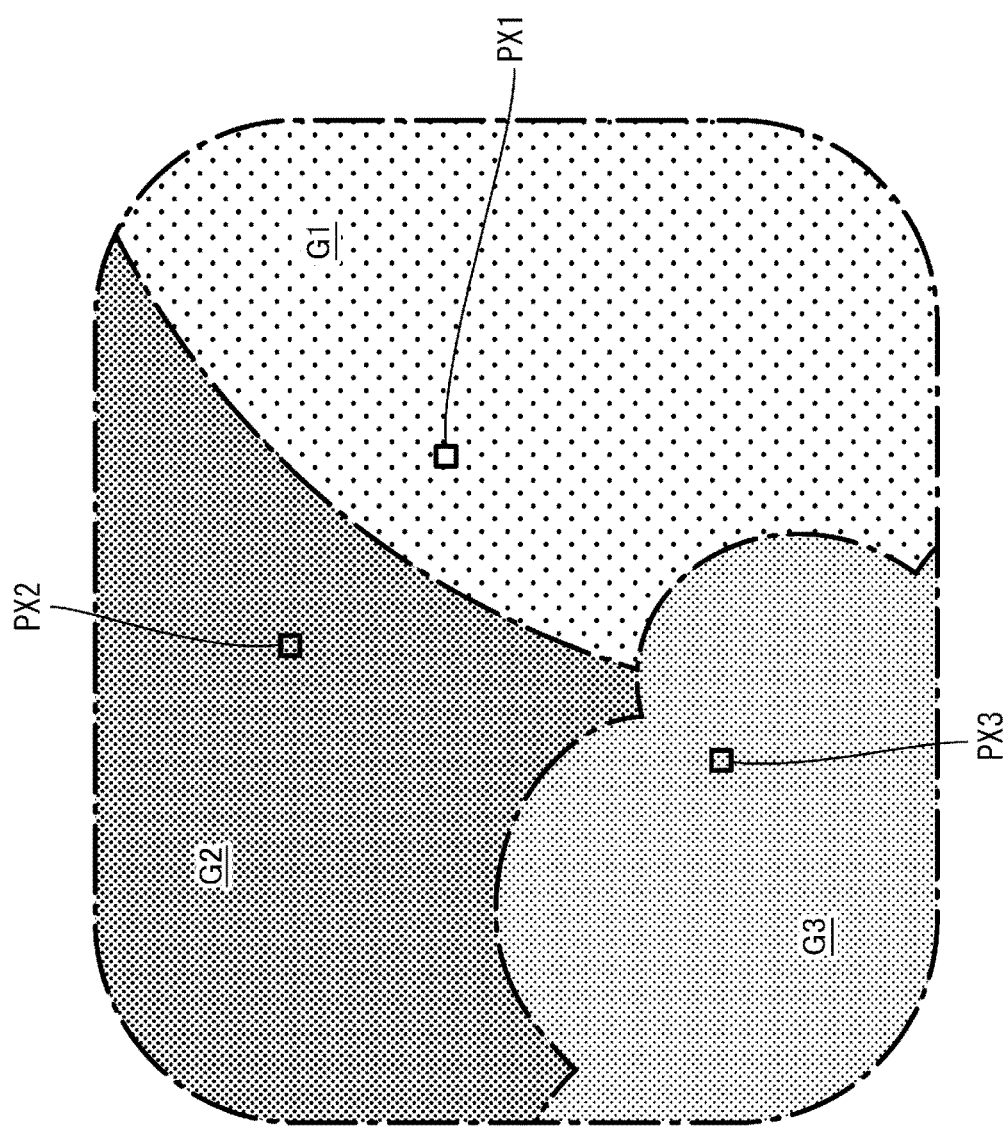
FIG. 10 is an enlarged view illustrating the vicinity of the boundaries between a first grayscale portion, a second grayscale portion, and a third grayscale portion in an image according to the first embodiment, and also illustrating first grayscale pixels, second grayscale pixels, and third grayscale pixels.
Figure 11:
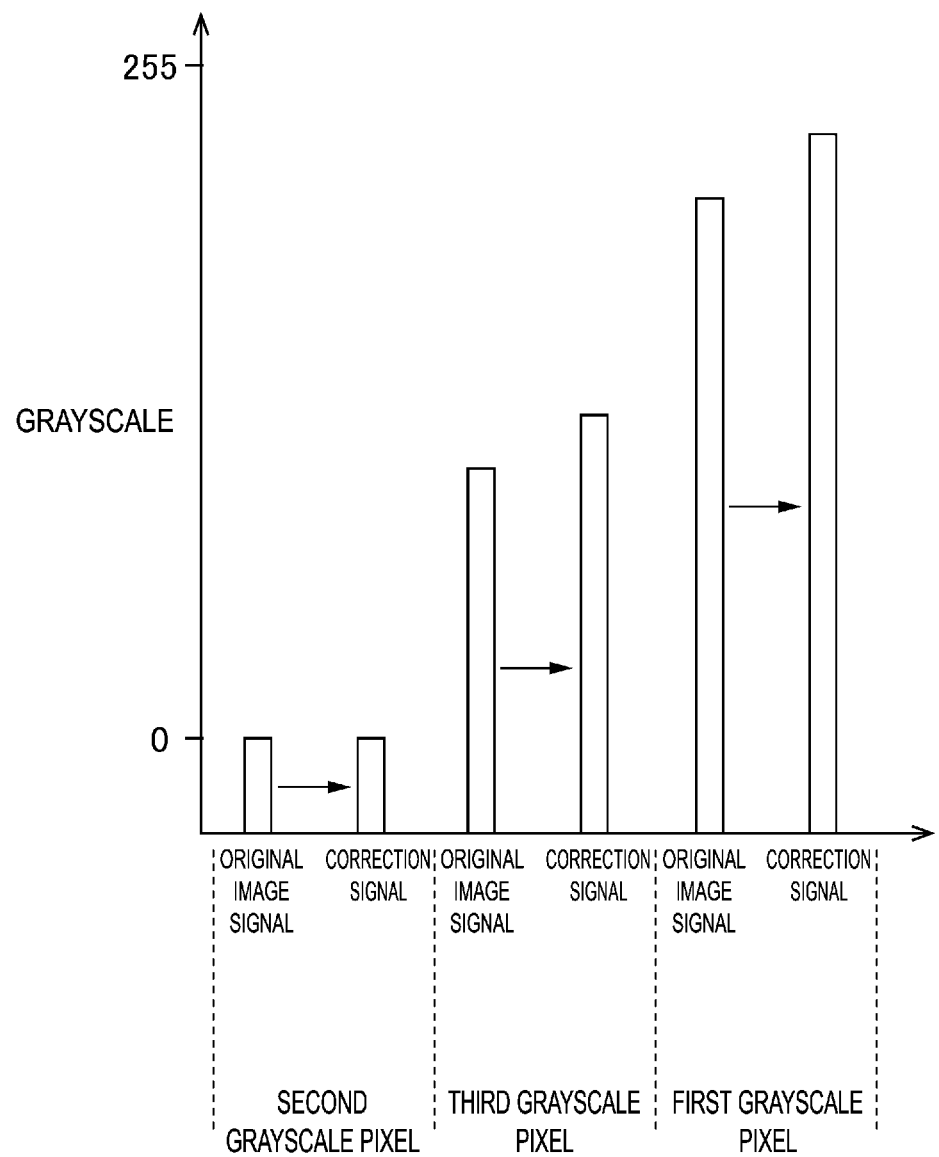
FIG. 11 is a graph showing a grayscale related to an original image signal and a grayscale related to a correction signal with respect to grayscales of the first grayscale pixels, the second grayscale pixels, and the third grayscale pixels according to the first embodiment.

Then, the correction circuit 32 performs correction processing for local dimming on the processed image signal output from the image signal processing circuit 31 to generate a correction signal. Specific correction processing by the correction circuit 32 will be described with reference to FIGS. 10 and 11. In FIG. 10, the vicinity of the boundaries between the first grayscale portion G1, the second grayscale portion G2, and the third grayscale portion G3 in the image is enlarged, and a first grayscale pixel PX1 in the first grayscale portion G1, a second grayscale pixel PX2 in the second grayscale portion G2, and a third grayscale pixel PX3 in the third grayscale portion G3 are illustrated. In FIG. 11, with respect to the grayscales of the first grayscale pixel PX1, the second grayscale pixel PX2, and the third grayscale pixel PX3, the grayscale of the original image signal and the grayscale of the correction signal are shown in a graph. The vertical axis in the graph of FIG. 11 represents grayscale (the grayscale value 0 to the grayscale value 255). As illustrated in FIGS. 10 and 11, the correction circuit 32 corrects the grayscale of the first grayscale pixel PX1 and the third grayscale pixel PX3, in which the grayscale value of the original image signal is higher than 0, to a grayscale lower than the grayscale of the original image signal. On the other hand, the correction circuit 32 maintains the grayscale value 0 for the second grayscale pixel PX2 in which the grayscale of the original image signal is the grayscale value 0. The panel control circuit 33 writes an image in the liquid crystal panel 11 based on such a correction signal.

Figure 12:
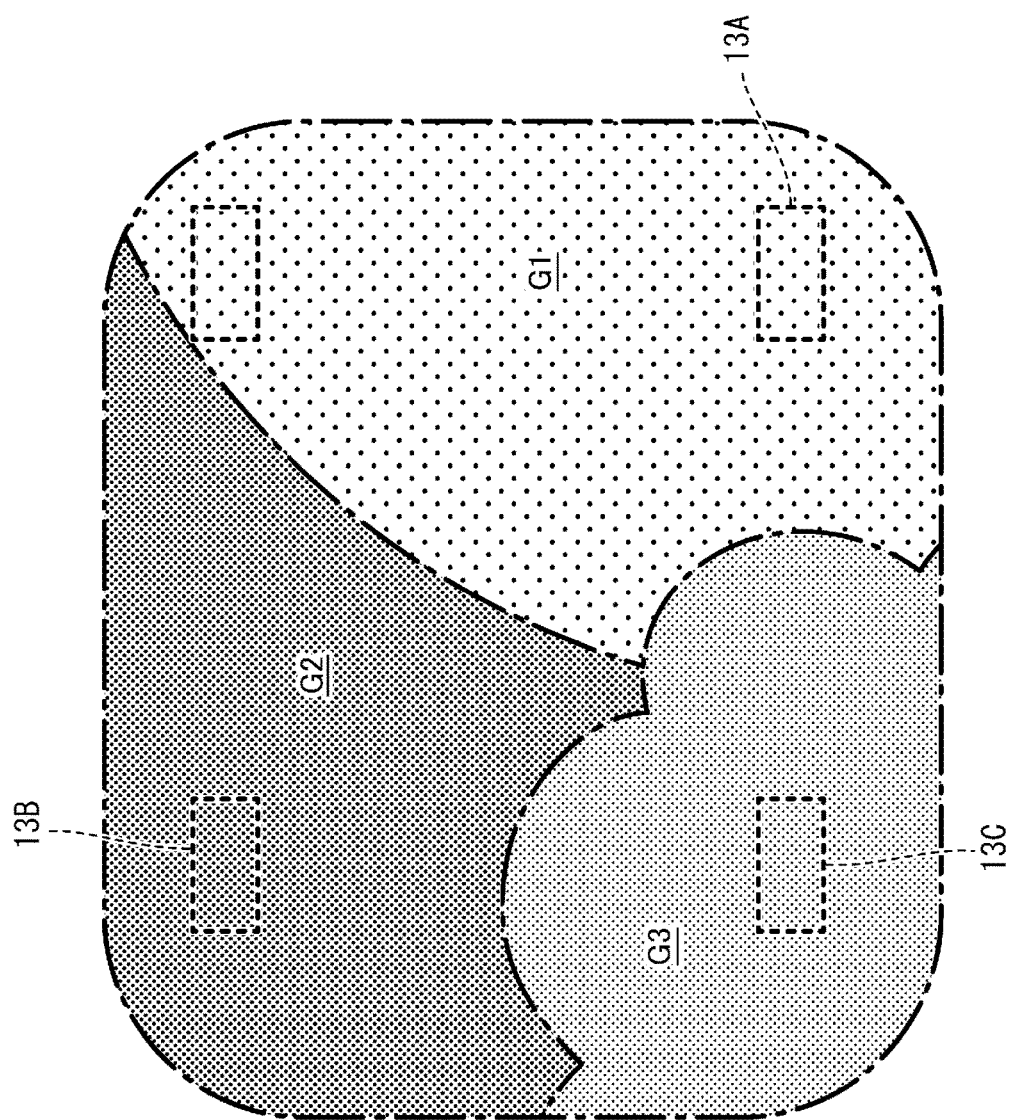
FIG. 12 is an enlarged view illustrating the vicinity of the boundaries between the first grayscale portion, the second grayscale portion, and the third grayscale portion in an image according to the first embodiment, and also illustrating a first LED overlapping the first grayscale portion, a first LED overlapping the second grayscale portion, and a first LED overlapping the third grayscale portion.
Figure 13:
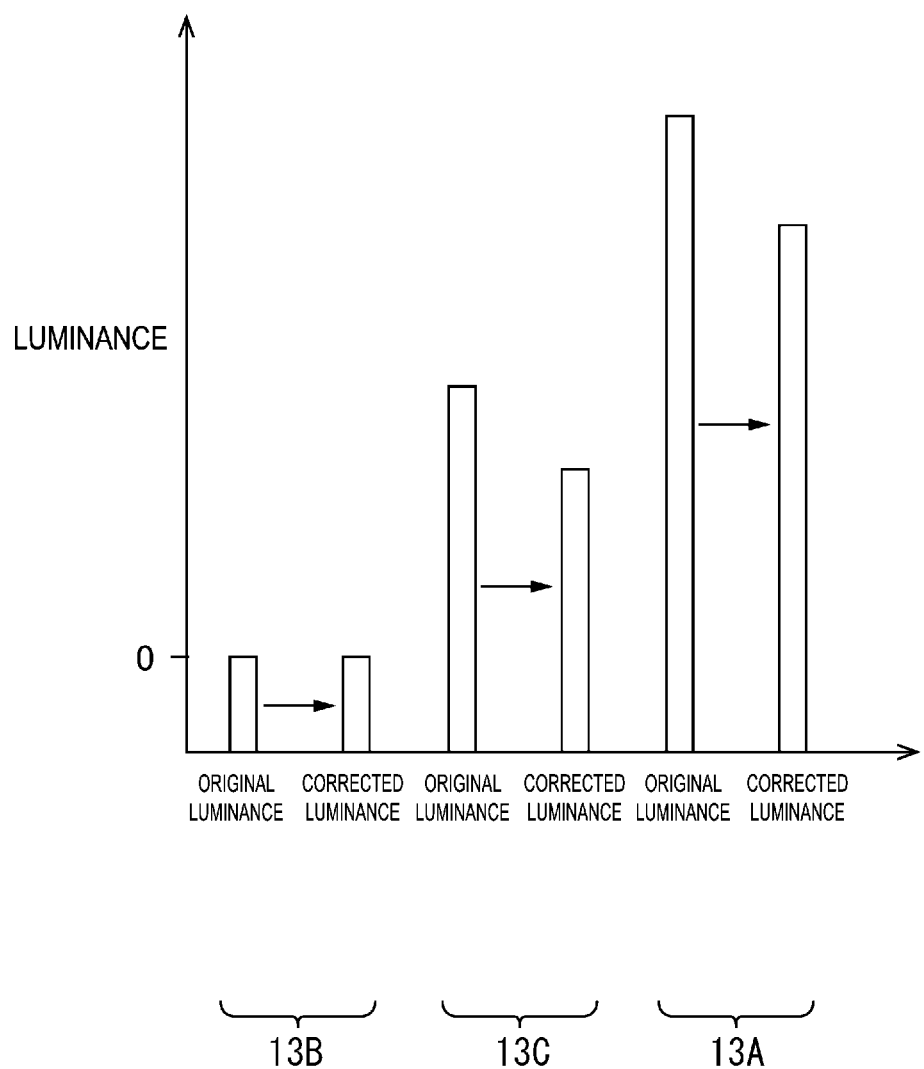
FIG. 13 is a graph showing the original luminance and the corrected luminance with respect to the grayscales of the first LED overlapping the first grayscale portion, the first LED overlapping the second grayscale portion, and the first LED overlapping the third grayscale portion according to the first embodiment.

The backlight control circuit 34 controls the luminance (light emission amount) of the first LEDs 13 to be lit based on the correction signal output from the correction circuit 32. Control of the luminance of the first LEDs 13 by the backlight control circuit 34 will be described with reference to FIGS. 12 and 13. In FIG. 12, the vicinity of the boundaries between the first grayscale portion G1, the second grayscale portion G2, and the third grayscale portion G3 in the image is enlarged, and first LEDs 13A overlapping the first grayscale portion G1, first LEDs 13B overlapping the second grayscale portion G2, and first LEDs 13C overlapping the third grayscale portion G3 are illustrated. In FIG. 13, the original luminance and the corrected luminance with respect to luminances of the first LEDs 13A, the first LEDs 13B, and the first LEDs 13C are shown in a graph. The vertical axis of the graph of FIG. 13 represents luminance. In FIG. 13, luminance being 0 means that LEDs are unlit. The backlight control circuit 34 corrects the luminance of the first LEDs 13A and the first LEDs 13C to be lit to lower luminance than the original luminance as illustrated in FIGS. 12 and 13. On the other hand, the backlight control circuit 34 keeps the unlit first LEDs 13B unlit.

As described above, the liquid crystal panel 11 and the backlight device 12 are controlled by the panel control circuit 33 and the backlight control circuit 34 based on the correction signal. Then, in the first grayscale portion G1 having the highest grayscale, the grayscale of the first grayscale pixel PX1 is corrected to have a higher value, and the luminance of the overlapping first LEDs 13A is corrected to be lower. As a result, the display grayscale of the first grayscale portion G1 becomes the same as that of the original image signal. Likewise, in the third grayscale portion G3 having an intermediate grayscale, the grayscale of the third grayscale pixel PX3 is corrected to have a higher value, and the luminance of the overlapping first LEDs 13C is corrected to be lower. As a result, the display grayscale of the third grayscale portion G3 becomes the same as that of the original image signal. On the other hand, in the second grayscale portion G2, the grayscale of the second grayscale pixel PX2 is maintained at the grayscale value 0, and the overlapping first LEDs 13C is maintained in an unlit state. In addition, since the luminance of the first LEDs 13A overlapping the first grayscale portion G1 and the first LEDs 13C overlapping the third grayscale portion G3 is low in the second grayscale portion G2 close to the first grayscale portion G1 and the third grayscale portion G3, the amount of radiation light from the first LEDs 13A and 13C is smaller than that in the case where correction is not performed. As a result, a display defect called "black floating" is less likely to occur in the second grayscale portion G2, and an image with excellent contrast performance can be displayed.

The control unit 30 according to the present embodiment can switch between display in the first display mode and display in the second display mode based on a display mode switching signal supplied from an external host system as illustrated in FIG. 7. The first display mode can be referred to as a "privacy mode" which allows display images to be visually recognized from the front passenger seat but inhibits the display images from being visually recognized from the driver's seat. The second display mode can be referred to as a "public mode" which allows display images to be visually recognized from both the driver's seat and the front passenger seat. A traveling speed of a passenger car in which the liquid crystal display device 10 is mounted can be used as a trigger for inputting a display mode switching signal. For example, the external host system can supply the display mode switching signal to the control unit 30 at each of the timing at which the traveling speed of the passenger car exceeds a threshold and the timing at which the traveling speed of the passenger car is below the threshold.

Figure 14:
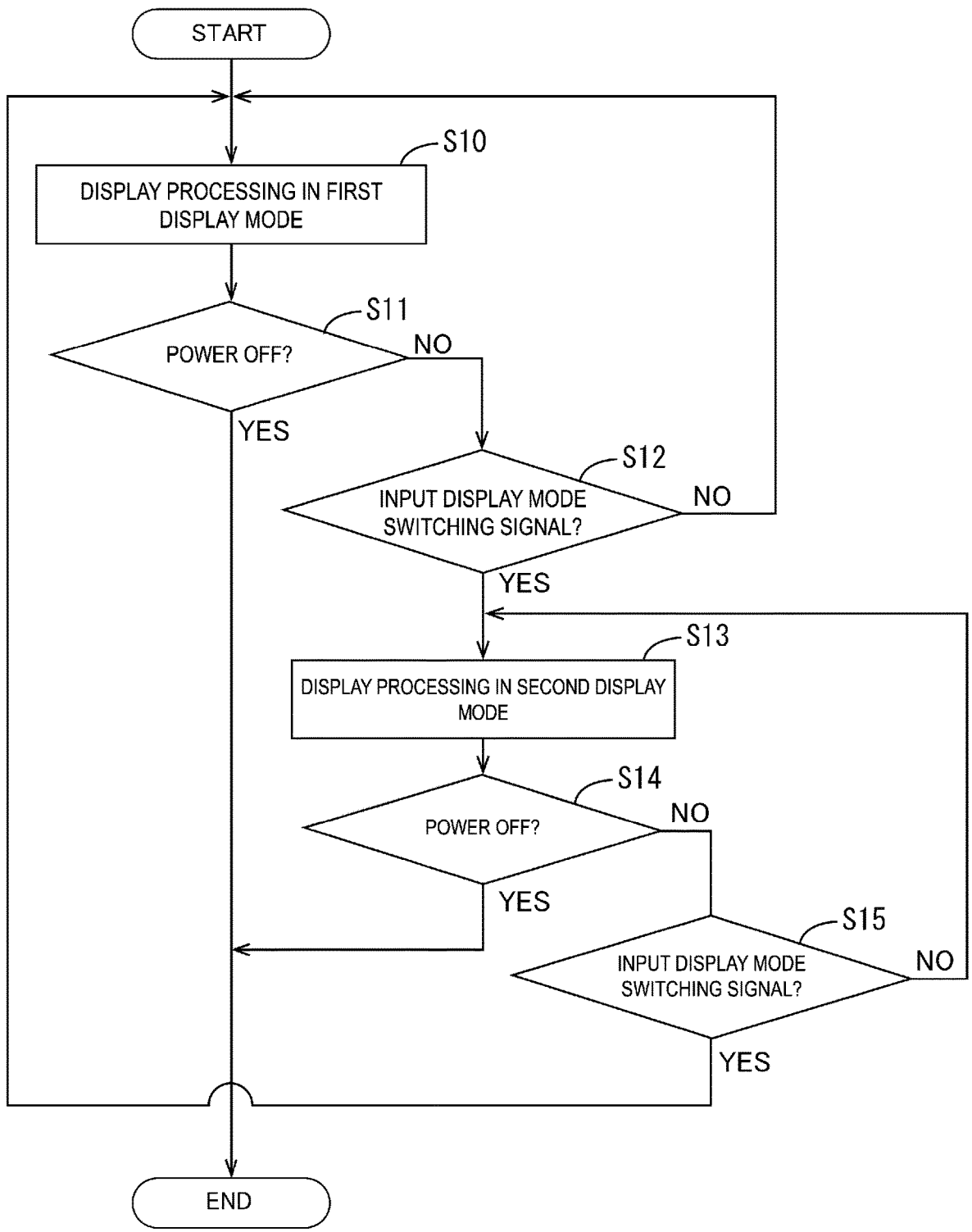
FIG. 14 is a flowchart depicting control of switching between display in a first display mode and display in a second display mode according to the first embodiment.

Control by the control unit 30 of switching between display in the first display mode and display in the second display mode will be described with reference to the flowchart of FIG. 14. According to FIG. 14, when power of the liquid crystal display device 10 is turned on, the control unit 30 performs display processing in the first display mode (step S10). Subsequently, the control unit 30 determines whether power of the liquid crystal display device 10 is off (step S11). If the result of the determination in step S11 is YES, the control unit 30 turns off the power of the liquid crystal display device 10 and ends the processing. If the result of the determination in step S11 is NO, the control unit 30 determines whether the display mode switching signal has been input (step S12). If the result of the determination in step S12 is NO, the processing returns to step S10, and the control unit 30 continues the display processing in the first display mode. If the result of the determination in step S12 is YES, the control unit 30 switches to the display processing in the second display mode (step S13). Subsequently, the control unit 30 determines whether power of the liquid crystal display device 10 is off (step S14). If the result of the determination in step S14 is YES, the control unit 30 turns off the power of the liquid crystal display device 10 and ends the processing. If the result of the determination in step S14 is NO, the control unit 30 determines whether the display mode switching signal has been input (step S15). If the result of the determination in step S15 is NO, the processing returns to step S13, and the control unit 30 continues the display processing in the second display mode. If the result of the determination in step S15 is YES, the processing returns to step S10, and the control unit 30 switches to the display processing in the first display mode.

Figure 15:
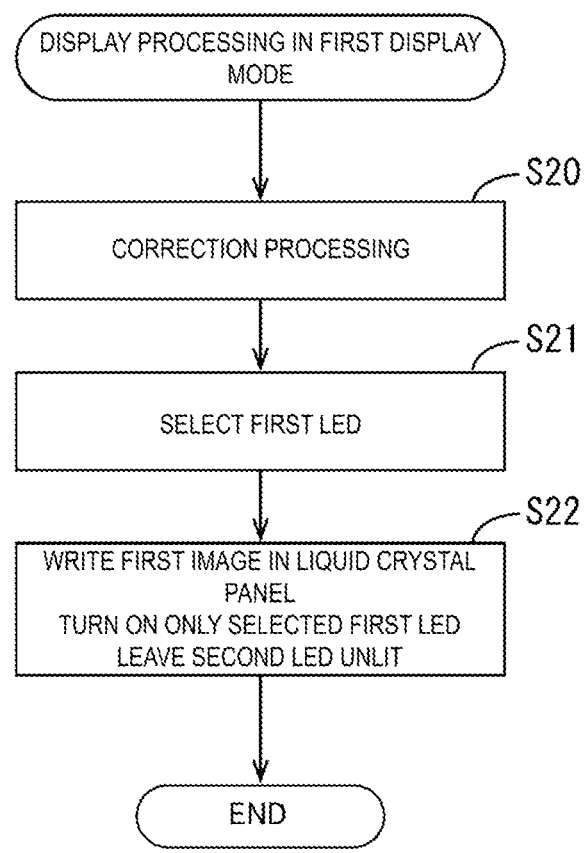
FIG. 15 is a flowchart depicting display processing in the first display mode according to the first embodiment.
Figure 17:
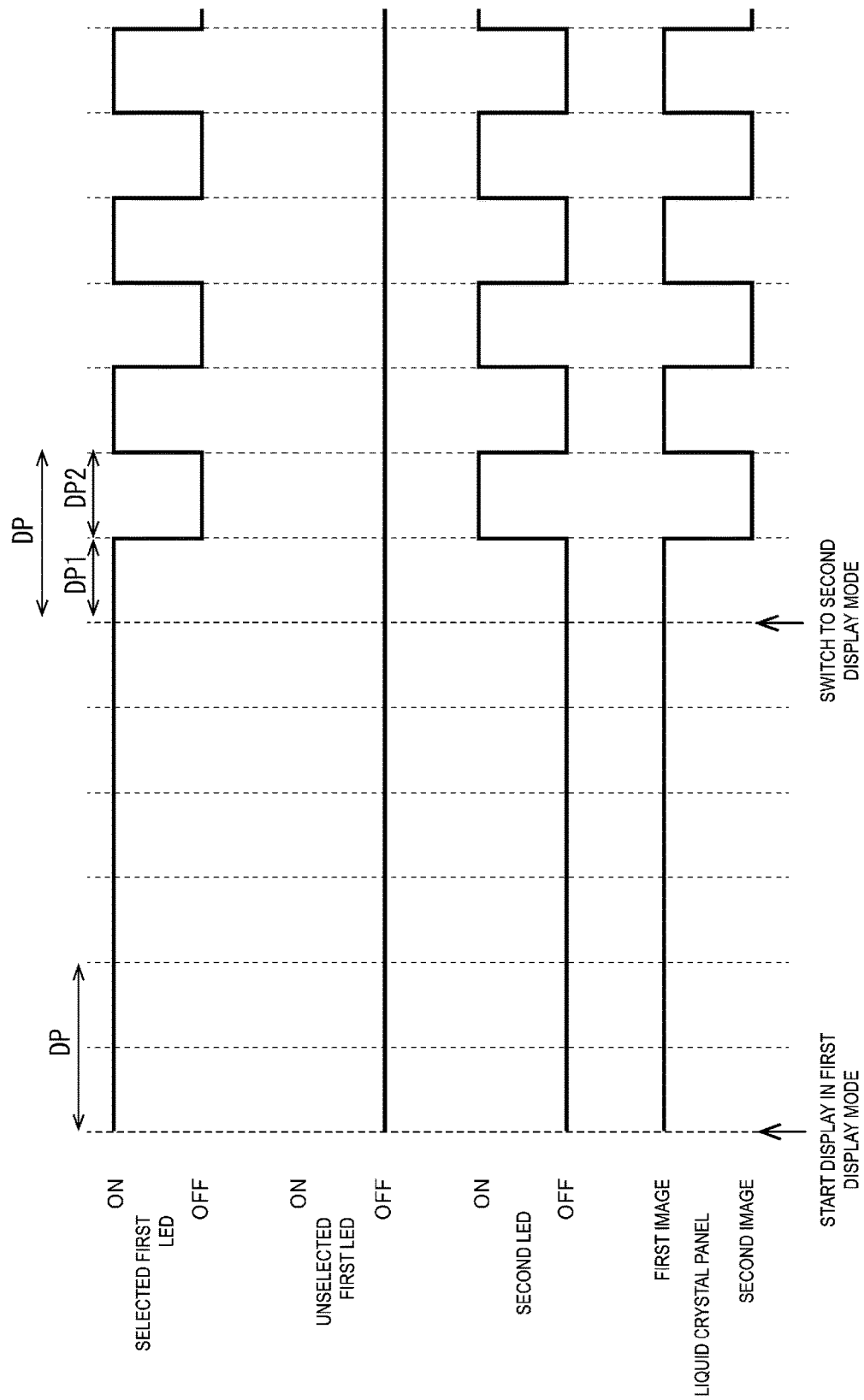
FIG. 17 is a timing chart illustrating control of switching between display in the first display mode and display in the second display mode according to the first embodiment.

The display processing in the first display mode will be described with reference to FIGS. 15 and 17. FIG. 15 is a flowchart of the display processing in the first display mode. FIG. 17 is a timing chart of the first display mode and the second display mode. In FIG. 17, lighting (ON) and non-lighting (OFF) of the first LEDs 13 and the second LED 17 are illustrated, and the types of images (first image and second image) written in the liquid crystal panel 11 are illustrated. FIG. 17 illustrates unit display periods DP. In the present embodiment, the refresh rate is 60 Hz, and a unit display period DP corresponds to a period in which 60 images are rewritten, that is, 1 second. In addition, in FIG. 17, each half period (corresponding to 0.5 seconds) of the unit display period DP is divided by a vertical broken line.

When the display processing in the first display mode is started, the control unit 30 performs correction processing in which the correction circuit 32 corrects an image signal to generate a correction signal (step S20) as illustrated in FIGS. 15 and 17. Subsequently, the control unit 30 selects the first LEDs 13 to be lit in the first display mode from among the plurality of first LEDs 13 based on the correction signal (step S21). Subsequently, the control unit 30 writes the first image based on the correction signal in the liquid crystal panel 11, turns on the first LEDs 13 selected in step S21, and leaves the second LED 17 and the first LEDs 13 that have not been selected in step S21 unlit (step S22). The "first image" mentioned here is an image written based on the correction signal whose grayscale has been corrected in the correction processing (see the grayscale based on the correction signal in FIG. 11). In addition, the luminance of the first LEDs 13 selected in step S22 is the luminance corrected based on the correction signal (see the luminance based on the correction signal in FIG. 13). In this way, when the image display in one unit display period DP is ended, the image display in the next unit display period DP is started.

As described above, when display is performed in the first display mode by the control unit 30, the first image based on the correction signal generated by correcting the image signal is written in the liquid crystal panel 11, and the plurality of first LEDs 13 are subjected to local dimming control based on the correction signal. Although the louver 16 does not regulate emission of light from the first LEDs 13 that have been selectively turned on by the local dimming control in the first angle range A1 around the first direction, the louver regulates emission of light in the second angle range A2 around the second direction. On the other hand, the second LED 17 is left unlit. Therefore, while the first image is visually recognized in the first angle range A1 with display quality excellent in contrast performance, the first image is hardly visually recognized in the second angle range A2. As described above, while visual recognition of display images from the front passenger seat is allowed in the first display mode, visual recognition of display images from the driver's seat is restricted.

Figure 16:
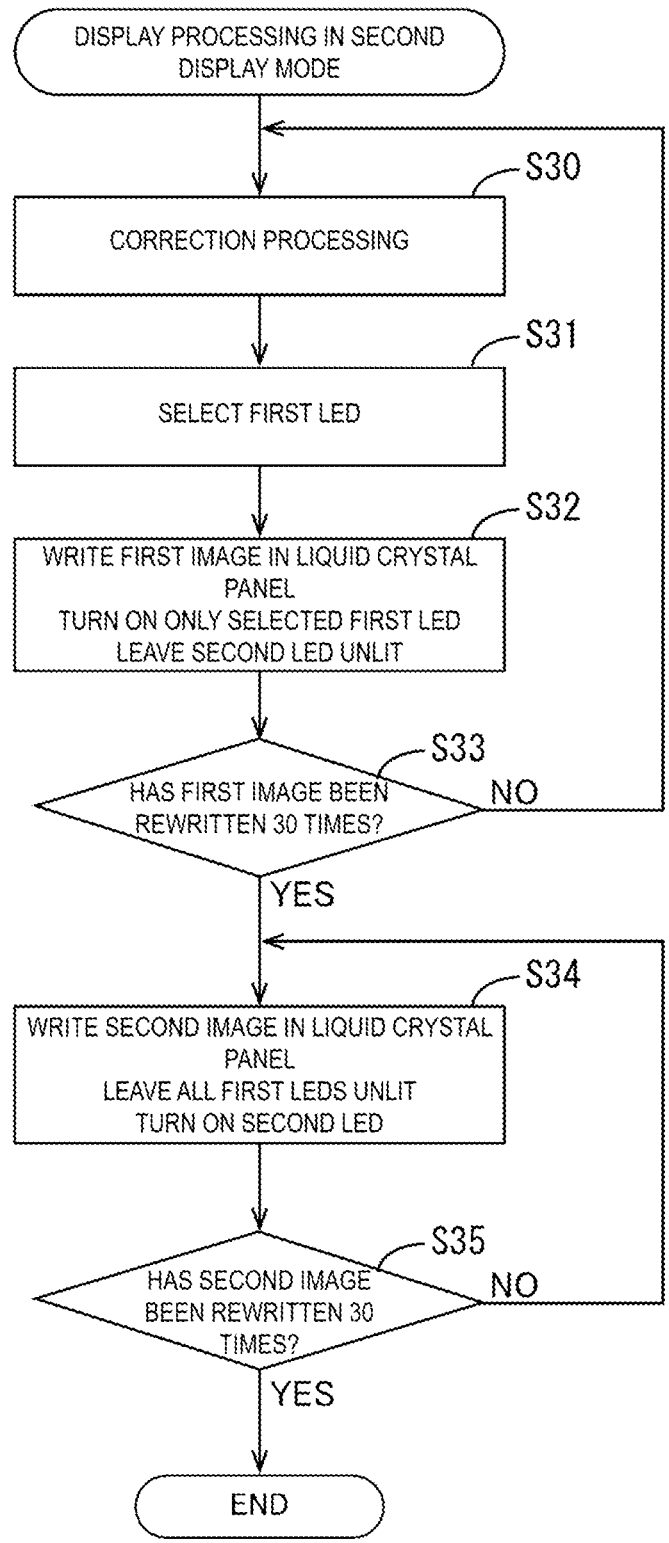
FIG. 16 is a flowchart depicting display processing in the second display mode according to the first embodiment.

The display processing in the second display mode will be described with reference to FIGS. 16 and 17. FIG. 16 is a flowchart of the display processing in the second display mode. When the display mode switching signal is input to the control unit 30 while display in the first display mode is performed, the control unit 30 performs correction processing in which the correction circuit 32 corrects an image signal to generate a correction signal (step S30) as illustrated in FIGS. 16 and 17. Subsequently, the control unit 30 selects the first LEDs 13 to be lit among the plurality of first LEDs 13 based on the correction signal (step S31). Subsequently, the control unit 30 writes the first image based on the correction signal in the liquid crystal panel 11, selectively turns on the first LEDs 13 selected in step S31, and leaves the second LED 17 and the first LEDs 13 that have not been selected in step S31 unlit (step S32).

Next, the control unit 30 determines whether the first image has been rewritten 30 times since the start of step S32 (step S33). This period during which the first image is rewritten is a first display period DP1. In the present embodiment, the first display period DP1 is a half period (corresponding to 0.5 seconds) of the unit display period DP. If the result of the determination in step S33 is NO, the processing returns to step S30, and the control unit 30 continues rewriting of the first image.

If the result of the determination in step S33 is YES, the control unit 30 writes the second image based on the image signal on which the correction processing has not been performed in the liquid crystal panel 11, and leaves all of the first LEDs 13 unlit and turns on the second LED 17 (step S34). The "second image" mentioned here is a processed image signal processed by the image signal processing circuit 31, and is an image written based on the original image signal that has not been subjected to the correction processing by the correction circuit 32 (see the grayscale based on the original image signal in FIG. 11). Furthermore, the luminance of the second LED 17 is the luminance based on the original image signal on which the correction processing has not been performed (see the luminance based on the original image signal in FIG. 13).

Next, the control unit 30 determines whether the second image has been rewritten 30 times since the start of step S34 (step S35). This period during which the second image is rewritten is a second display period DP2. In the present embodiment, the second display period DP2 is a half period (corresponding to 0.5 seconds) of the unit display period DP. That is, a ratio of the first display period DP1 occupying the unit display period DP is equal to a ratio of the second display period DP2. If the result of the determination in step S35 is NO, the processing returns to step S34, and the control unit 30 continues rewriting of the second image. If the result of the determination in step S35 is YES, the control unit 30 ends the image display in one unit display period DP and starts image display in the next unit display period DP.

As described above, when the control unit 30 performs display in the second display mode, the first image based on the correction signal and the second image based on the original image signal which has not been corrected are written in the liquid crystal panel 11 in a time division manner. In the first display period DP1 in which the first image is written, the plurality of first LEDs 13 are selectively turned on based on the correction signal, and the second LED 17 is left unlit. Therefore, in the first display period DP1, while the first image is visually recognized in the first angle range A1 with excellent display quality, the first image is hardly visually recognized in the second angle range A2. In the second display period DP2 in which the second image is written, all of the first LEDs 13 are left unlit and the second LED 17 is turned on. Therefore, in the second display period DP2, while the second image is visually recognized in the second angle range A2, the first image is hardly visually recognized in the first angle range A1. In this manner, in the first angle range A1, only the first image displayed using the light from the plurality of first LEDs 13 subjected to the local dimming control in the first display period DP1 is visually recognized. As a result, the display quality of the first image visually recognized in the first angle range A1 can be improved. As described above, visual recognition of display images from both the driver's seat and the front passenger seat is allowed in the second display mode.

Here, if the second LED 17 is turned on in a state where the first image based on the correction signal is written in the liquid crystal panel 11 in the second display period DP2, there is a concern that the display quality may significantly deteriorate because the second LED 17 is not subjected to local dimming control. In this regard, because the second image based on the image signal which has not been corrected for local dimming is written in the liquid crystal panel 11 in the second display period DP2, the display quality of the second image displayed using light from the second LED 17 without local dimming control becomes excellent.

In addition, since the ratio of the first display period DP1 occupying the unit display period DP is equal to the ratio of the second display period DP2, it is possible to prevent one of the first display period DP1 and the second display period DP2 from being shorter than the other. Accordingly, in both the first display period DP1 and the second display period DP2, a decrease in the refresh rate is curbed, and thus a display defect called flickering is less likely to occur.

As described above, the liquid crystal display device (display device) 10 of the present embodiment includes the liquid crystal panel (display panel) 11 having the first main surface 11A, the backlight device (illumination device) 12 that radiates light to the first main surface 11A, and the control unit 30 that controls the liquid crystal panel 11 and the backlight device 12, in which the backlight device 12 includes the plurality of first LEDs (first light sources) 13, the louver (first light control unit 16) that imparts an optical effect to light emitted from the plurality of first LEDs 13, and while regulating emission of light in the first angle range A1 around the first direction having an angle with respect to the first main surface 11A, regulates emission of light in the second angle range A2 around the second direction having an angle that is different from the first direction with respect to the first main surface 11A, the second LED (second light source) 17, and the light guide plate 18 that is a second light control unit that imparts an optical effect to light emitted from the second LED 17 and causes light to be emitted at least in the second angle range A2, the control unit 30 switches display between display in the first display mode and display in the second display mode based on input of a display switching signal, when performing the display in the first display mode, the control unit 30 corrects an image signal to generate a correction signal, writes a first image based on the correction signal in the liquid crystal panel 11, leaves the second LED 17 unlit, and selectively turns on the plurality of first LEDs 13 based on the correction signal, and when performing the display in the second display mode, the control unit 30 causes the unit display period DP to include the first display period DP 1 and the second display period DP2, in the first display period DP1 generates the correction signal, writes the first image in the liquid crystal panel 11, leaves the second LED 17 unlit, and selectively turns on the plurality of first LEDs 13 based on the correction signal, and in the second display period DP2 writes the second image based on the image signal in the liquid crystal panel 11 and turns on at least the second LED 17.

When the control unit 30 performs display in the first display mode, the first image based on the correction signal generated by correcting the image signal is written in the liquid crystal panel 11, and the plurality of first LEDs 13 provided in the backlight device 12 are selectively turned on based on the correction signal. Although the louver 16 does not regulate emission of light from the first LEDs 13 that have been selectively turned on in the first angle range A1 around the first direction, the louver regulates emission of light in the second angle range A2 around the second direction. On the other hand, the second LED 17 is left unlit. Thus, while the first image is visually recognized in the first angle range A1 with excellent display quality, the first image is hardly visually recognized in the second angle range A2.

When the control unit 30 performs display in the second display mode, the first image based on the correction signal and the second image based on the image signal are written in the liquid crystal panel 11 in a time division manner. In the first display period DP1 in which the first image is written, the plurality of first LEDs 13 are selectively turned on based on the correction signal, and the second LED 17 is left unlit. Therefore, in the first display period DP1, while the first image is visually recognized in the first angle range A1 with excellent display quality, the first image is hardly visually recognized in the second angle range A2. In the second display period DP2 in which the second image is written, at least the second LED 17 is turned on. As a result, the second image is visually recognized at least in the second angle range A2 in the second display period DP2. In this manner, in the second display mode, at least the first image is visually recognized in the first angle range A1 and the second image is visually recognized in the second angle range A2.

Here, if the second LED 17 is turned on in a state where the first image based on the correction signal is written in the liquid crystal panel 11 in the second display period DP2, there is a concern that the display quality may significantly deteriorate because the second LED 17 is not subjected to local dimming control. In this regard, because the second image based on the image signal which has not been corrected for local dimming is written in the liquid crystal panel 11 in the second display period DP2, the display quality of the second image displayed using light from the second LED 17 without local dimming control becomes excellent.

In addition, when performing display in the second display mode, the control unit 30 leaves all of the plurality of first LEDs 13 unlit in the second display period DP2. In the second display period DP2 in which the second image is written, whereas the second LED 17 is turned on, all of the plurality of first LEDs 13 are left unlit. Therefore, in the second display period DP2, while the second image is visually recognized in the second angle range A2, the first image is hardly visually recognized in the first angle range A1. In this manner, in the first angle range A1, only the first image displayed using the light from the plurality of first LEDs 13 subjected to the local dimming control in the first display period DP1 is visually recognized. As a result, the display quality of the first image visually recognized in the first angle range A1 can be improved.

In addition, the control unit 30 makes the ratio of the first display period DP1 occupying the unit display period DP equal to the ratio of the second display period DP2. With this configuration, it is possible to prevent one of the first display period DP1 and the second display period DP2 from being shorter than the other. Accordingly, in both the first display period DP1 and the second display period DP2, a decrease in the refresh rate is curbed, and thus a display defect called flickering is less likely to occur.

In addition, with the first direction set to match the normal direction of the first main surface 11A, the louver 16 has at least two light blocking portions 16C that are arranged at an interval in the third direction along both the first main surface 11A and the surface in the first direction and the second direction and that block light, and the light transmitting portion 16D that is arranged between the two light blocking portions 16C and that transmits light. Light emitted from any one of the plurality of first LEDs 13 is transmitted through the light transmitting portion 16D arranged between the two light blocking portions 16C constituting the louver 16. The emission angle of the transmitted light of the light transmitting portion 16D is limited by the two light blocking portions 16C in the third direction. Accordingly, although the louver 16 does not regulate emission of light in the first angle range A1 around the first direction, which is the normal direction of the first main surface 11A, the louver can regulate emission of light in the second angle range A2 around the second direction.

In addition, the plurality of first LEDs 13 are arranged side by side at intervals within the first main surface 11A. The plurality of first LEDs 13 arranged side by side at intervals within the first main surfaces 11A of the liquid crystal panel 11 are selectively turned on based on the correction signal from the control unit 30, and thus the first main surface 11A of the liquid crystal panel 11 can be irradiated with light suitable for the first image based on the correction signal. As a result, the display quality of the first image can be improved.

Furthermore, the second light control unit is configured as the light guide plate 18 including the second main surface 18B and the third main surface 18C parallel to the first main surface 11A, at least a portion of the outer circumferential end surface of the light guide plate 18 is the first end surface 18A that faces the second LED 17 and receives incidence of light, the second main surface 18B emits light, the third main surface 18C is arranged facing the louver 16, the second LED 17 is arranged side by side with the light guide plate 18 in the third direction along both the first main surface 11A and the surface in the first direction and the second direction, and the third lens (lens) 22 including the second inclined surface (inclined surface) 22A having an inclination rising from the side opposite to the second LED 17 in the third direction toward the second LED 17 is provided on the third main surface 18C. Light emitted from the second LED 17 and incident on the first end surface 18A of the light guide plate 18 hits the second inclined surface 22A of the third lens 22 provided on the third main surface 18C while propagating inside the light guide plate 18. The light hitting the second inclined surface 22A having an inclination rising from the side opposite to the second LED 17 in the third direction toward the second LED 17 in the light guide plate 18 is reflected and emitted from the second main surface 18B. The emission light from the second main surface 18B includes more light toward the side opposite to the second LED 17 side in the third direction with respect to the normal direction of the first main surface 11A, that is, the front direction than light toward the second LED 17 side in the third direction. Thus, when the second LED 17 is turned on, the emission light having a luminance angle distribution in which the peak luminance of the emission light is biased toward the side opposite to the second LED 17 side in the third direction can be supplied. By matching the center of the luminance angle distribution of the light emitted from the second main surface 18B of the light guide plate 18 caused by turning on the second LED 17 with the second direction, light can be efficiently emitted in the second angle range A2 around the second direction. In addition, the light guide plate 18 can transmit light emitted from the louver 16.

Second Embodiment

A second embodiment will be described with reference to FIG. 18. In this second embodiment, a case in which display in the second display mode is changed will be described. Further, description of structures, actions, and effects similar to those of the first embodiment described above will be omitted.

Figure 18:
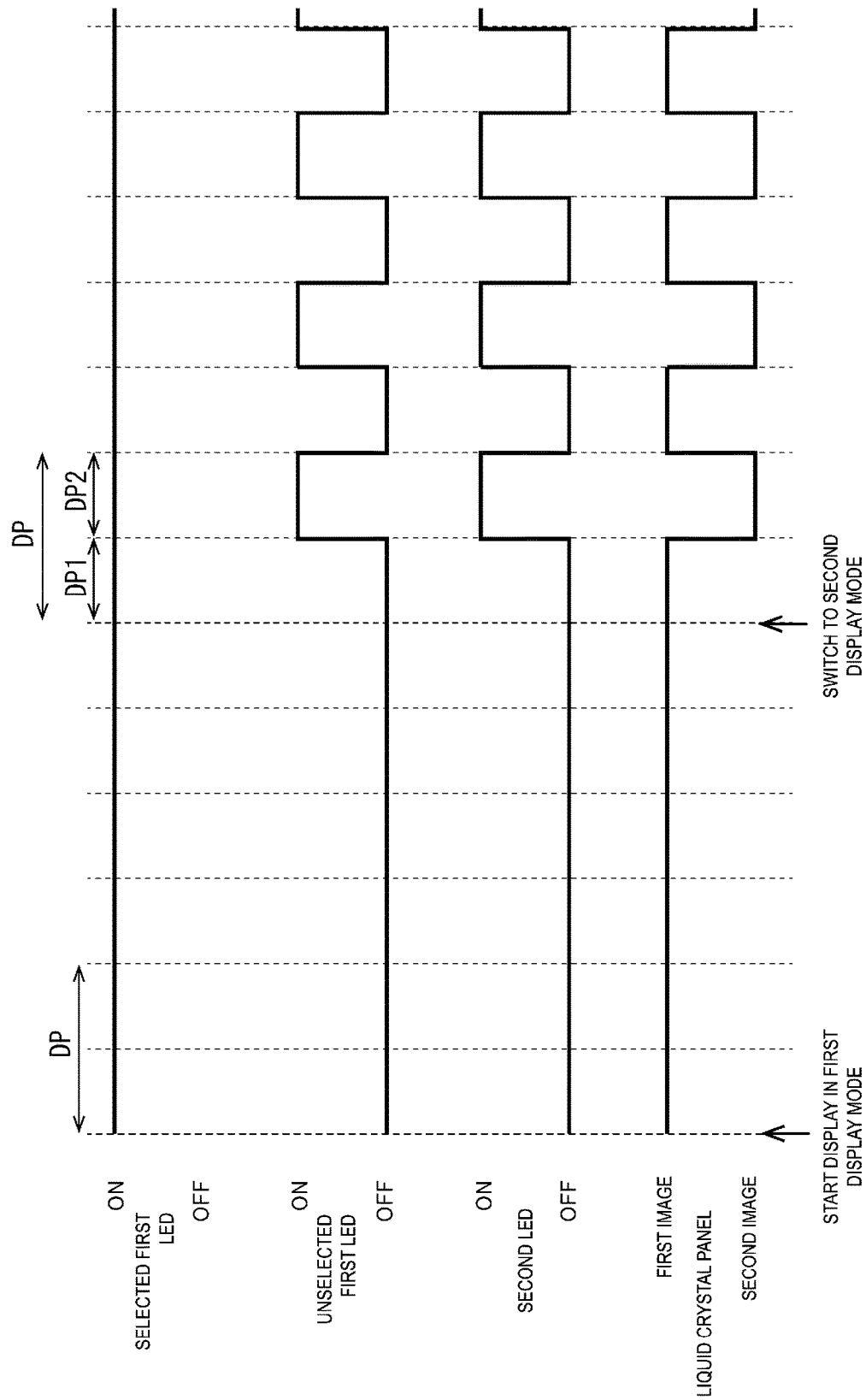
FIG. 18 is a timing chart illustrating control of switching between display in the first display mode and display in the second display mode according to a second embodiment.

When performing display in the second display mode, the control unit 30 according to the present embodiment turns on all of the plurality of first LEDs 13 in the second display period DP2 as illustrated in FIG. 18. Specifically, when performing display in the second display mode, the control unit 30 turns on the first LEDs 13 selected based on the correction signal and leaves the unselected first LEDs 13 and the second LED 17 unlit in the first display period DP1 in which the first image is written, as in the first embodiment. On the other hand, in the second display period DP2 in which the second image is written, the control unit 30 turns on all of the first LEDs 13 in addition to turning on the second LED 17. Further, along with this operation, "leave all of the first LEDs unlit" described in step S34 in the flowchart of FIG. 16 is changed to "turn on all of the first LEDs". Therefore, in the second display period DP2, the second image is visually recognized in both the first angle range A1 and the second angle range A2. In this manner, the first image displayed by using light from the plurality of first LEDs 13 subjected to local dimming control in the first display period DP1 and the second image displayed by using light from all of the plurality of first LEDs 13 that are turned on in the second display period DP2 are visually recognized in the first angle range A1. As a result, the luminance of images visually recognized in the first angle range A1, that is, from the front passenger seat, can be improved.

As described above, according to the present embodiment, when performing display in the second display mode, the control unit 30 turns on all of the plurality of first LEDs 13 in the second display period DP2. In the second display period DP2 in which the second image is written, the second LED 17 is turned on, and furthermore all of the plurality of first LEDs 13 are turned on. Therefore, in the second display period DP2, the second image is visually recognized in both the first angle range A1 and the second angle range A2. In this manner, the first image displayed by using light from the plurality of first LEDs 13 subjected to local dimming control in the first display period DP1 and the second image displayed by using light from all of the plurality of first LEDs 13 that are turned on in the second display period DP2 are visually recognized in the first angle range A1. As a result, the luminance of images visually recognized in the first angle range A1 can be improved.

Third Embodiment

A third embodiment will be described with reference to FIG. 19. In the third embodiment, a case will be introduced in which the timing at which the first LEDs 13 and the second LED 17 are turned on in display in the second display mode is changed from that in the first embodiment.

Further, description of structures, actions, and effects similar to those of the first embodiment described above will be omitted.

Figure 19:
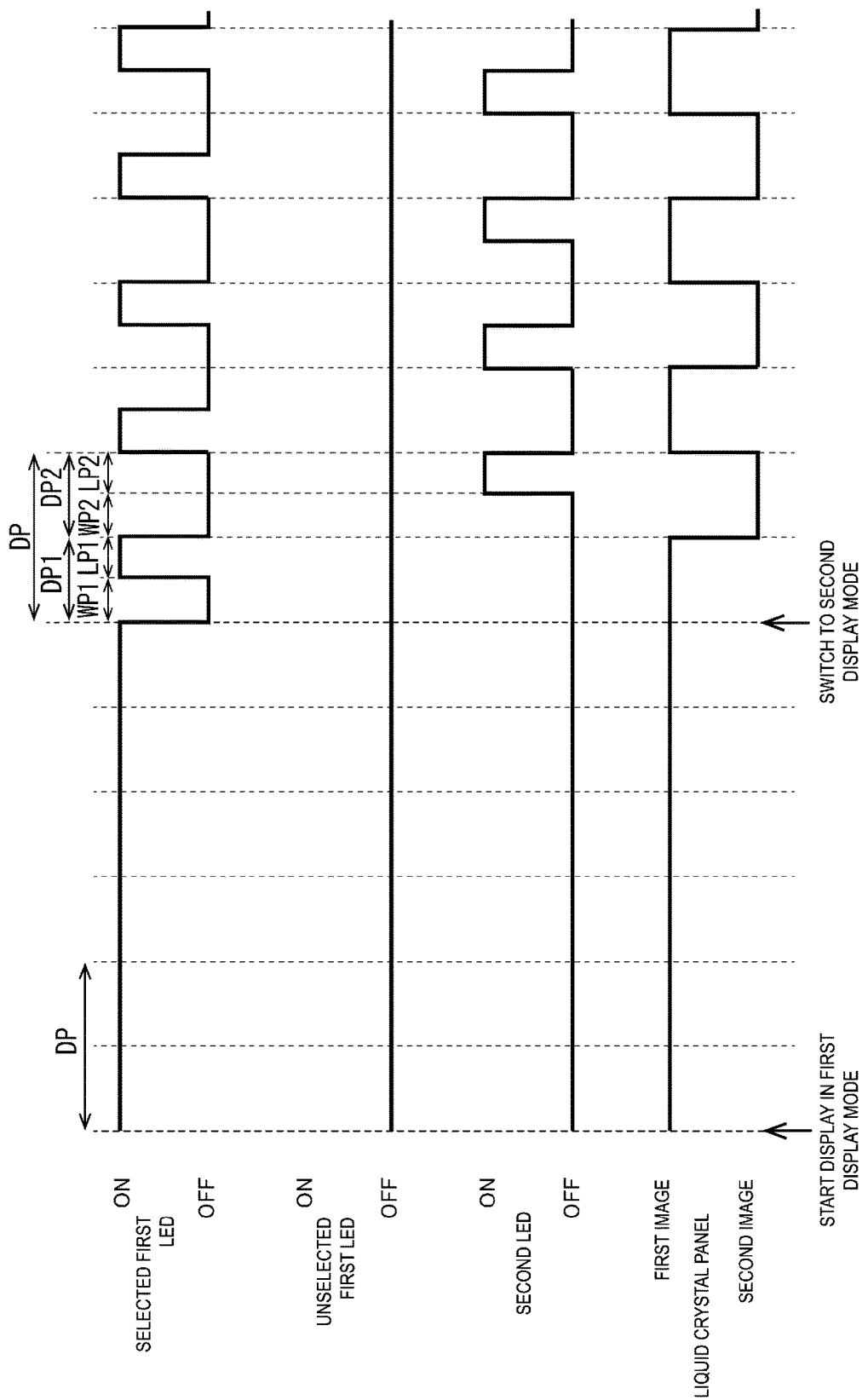
FIG. 19 is a timing chart illustrating control of switching between display in the first display mode and display in the second display mode according to a third embodiment.

When performing display in the second display mode, the control unit 30 according to the present embodiment turns on first LEDs 13 selected at a timing later than the timing at which the first display period DP1 is started as illustrated in FIG. 19. Specifically, when performing display in the second display mode, the control unit 30 writes the first image in the liquid crystal panel 11 and then turns on the first LEDs 13 selected based on the correction signal after a first standby period WP1 elapses in the first display period DP1. Further, along with this operation, "turn on only selected first LEDs" described in step S32 in the flowchart of FIG. 16 is changed to "turn on only selected first LEDs after the first standby period elapses". In the present embodiment, the first standby period WP1 is set to, for example, about half the first display period DP1 (a quarter of the unit display period DP). In addition, in the present embodiment, a first lighting period LP1 during which the selected first LEDs 13 are turned on is, for example, about half the first display period DP1, and is about the same as the first standby period WP1. Here, the liquid crystal panel 11 may require a predetermined response time from when the first image is written to when the first image reaches a predetermined display grayscale in the first display period DP1. Even in this case, since the control unit 30 writes the first image in the liquid crystal panel 11 and turns on the selected first LEDs 13 after the first standby period WP1 elapses, light for display can be supplied to the first image that has reached the predetermined display grayscale. As a result, the display quality of the first image is satisfactory.

When performing display in the second display mode, the control unit 30 turns on the second LED 17 at a timing later than the timing at which the second display period DP2 is started. Specifically, when performing display in the second display mode, the control unit 30 writes the second image in the liquid crystal panel 11 and then turns on the second LED 17 after a second standby period WP2 elapses in the second display period DP2. Further, along with this operation, "turn on the second LED" described in step S34 in the flowchart of FIG. 16 is changed to "turn on the second LED after the second standby period elapses". In the present embodiment, the second standby period WP2 is set to, for example, about half the second display period DP2 (a quarter of the unit display period DP). In addition, in the present embodiment, a second lighting period LP2 during which the second LED 17 is turned on is, for example, about half the second display period DP2, and is about the same as the second standby period WP2. Here, the liquid crystal panel 11 may require a predetermined response time from when the second image is written to when the second image reaches a predetermined display grayscale in the second display period DP2. Even in this case, since the control unit 30 writes the second image in the liquid crystal panel 11 and turns on the second LED 17 after the second standby period WP2 elapses, light for display can be supplied to the second image that has reached the predetermined display grayscale. As a result, the display quality of the second image is satisfactory.

According to the present embodiment described above, when performing display in the second display mode, the control unit 30 writes the first image in the liquid crystal panel 11 and then selectively turns on the plurality of first LEDs 13 based on the correction signal after the first standby period WP1 elapses in the first display period DP1. The liquid crystal panel 11 may require a predetermined response time from when the first image is written to when the first image reaches a predetermined display grayscale in the first display period DP1. Even in this case, since the control unit 30 writes the first image in the liquid crystal panel 11 and selectively turns on the plurality of first LEDs 13 after the first standby period WP1 elapses, light for display can be supplied to the first image that has reached the predetermined display grayscale. As a result, the display quality of the first image is satisfactory.

In addition, when performing display in the second display mode, the control unit 30 writes the second image in the liquid crystal panel 11 and then turns on at least the second LED 17 after the second standby period WP2 elapses in the second display period DP2. The liquid crystal panel 11 may require a predetermined response time from when the second image is written to when the second image reaches a predetermined display grayscale in the second display period DP2. Even in this case, since the control unit 30 writes the second image in the liquid crystal panel 11 and turns on at least the second LED 17 after the second standby period WP2 elapses, light for display can be supplied to the second image that has reached the predetermined display grayscale. As a result, the display quality of the second image is satisfactory.

Fourth Embodiment

A fourth embodiment will be described with reference to FIG. 20. In the fourth embodiment, a case in which a ratio of the first display period DP1 and a ratio of the second display period DP2 occupying the unit display period DP are changed from those in the first embodiment is introduced. Further, description of structures, actions, and effects similar to those of the first embodiment described above will be omitted.

Figure 20:
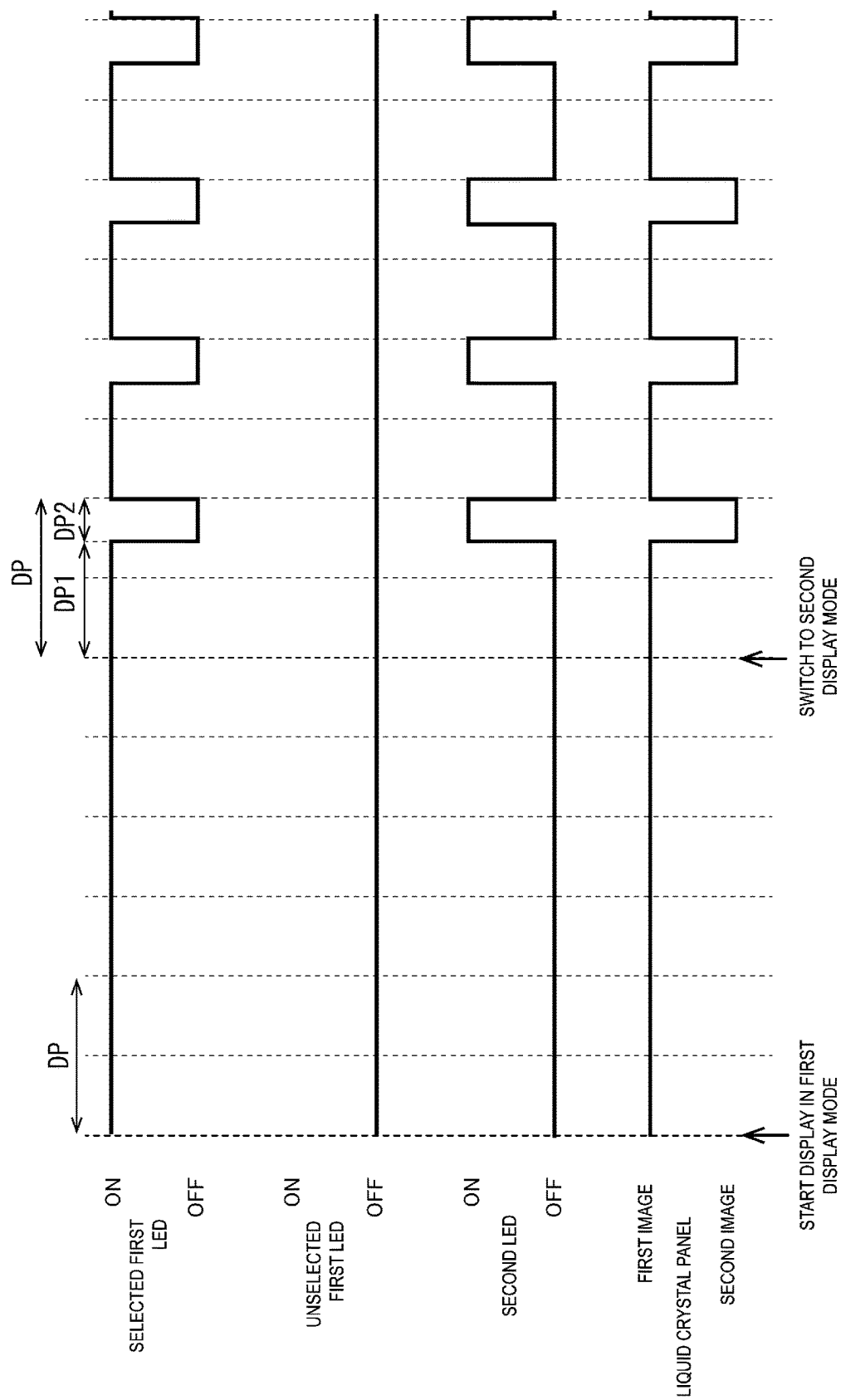
FIG. 20 is a timing chart illustrating control of switching between display in the first display mode and display in the second display mode according to a fourth embodiment.

As illustrated in FIG. 20, when performing display in the second display mode, the control unit 30 according to the present embodiment sets a ratio of the first display period DP1 occupying the unit display period DP to be higher than a ratio of the second display period DP2. In particular, the control unit 30 sets the ratio of the first display period DP1 to the second display period DP2 occupying the unit display period DP to, for example, "3:1". When the ratios are expressed in percentage, the first display period DP1 accounts for 75%, and the second display period DP2 accounts for 25%. Based on these ratios, the control unit 30 rewrites the first image 45 times in the first display period DP1, and rewrites the second image 15 times in the second display period DP2. Further, accordingly, step S33 of the flowchart of FIG. 16 is changed to "has the first image been rewritten 45 times?" and step S35 is changed to "has the second image been rewritten 15 times?".

As described in the first embodiment above, in the first display period DP1, the control unit 30 corrects the image signal to generate the correction signal, writes the first image based on the correction signal in the liquid crystal panel 11, and selectively turns on the plurality of first LEDs 13 based on the correction signal. As described above, it is more difficult in the first display period DP1 in which local dimming control is performed to synchronize the control of the liquid crystal panel 11 and the control of the backlight device 12, compared to the second display period DP2 in which local dimming control is not performed. In this regard, if the ratio of the first display period DP1 occupying the unit display period DP is higher than the ratio of the second display period DP2, it is easy to synchronize the control of the liquid crystal panel 11 and the control of the backlight device 12 in the first display period DP1. Accordingly, since light for display can be supplied to the first image that has reached the predetermined display grayscale, the display quality of the first image is improved.

As described above, according to the present embodiment, the control unit 30 makes the ratio of the first display period DP1 occupying the unit display period DP higher than the ratio of the second display period DP2. As described above, in the first display period DP1, the control unit 30 corrects the image signal to generate the correction signal, writes the first image based on the correction signal in the liquid crystal panel 11, and selectively turns on the plurality of first LEDs 13 based on the correction signal. As described above, it is more difficult in the first display period DP1 in which local dimming control is performed to synchronize the control of the liquid crystal panel 11 and the control of the backlight device 12, compared to the second display period DP2 in which local dimming control is not performed. In this regard, if the ratio of the first display period DP1 occupying the unit display period DP is higher than the ratio of the second display period DP2, it is easy to synchronize the control of the liquid crystal panel 11 and the control of the backlight device 12 in the first display period DP1. Accordingly, since light for display can be supplied to the first image that has reached the predetermined display grayscale, the display quality of the first image is improved.

Other Embodiments

The techniques disclosed in the present specification are not limited to the embodiments described above and illustrated in the drawings, and the following embodiments, for example, are also included within the technical scope.

(1) How to correct the grayscale of each of the pixels PX1 to PX3 in the correction processing performed by the correction circuit 32 can be appropriately changed in a manner other than the illustration of FIG. 11.

(2) How to correct the luminance of each of first LEDs 13A to 13C in the correction processing by the correction circuit 32 can be appropriately changed in a manner other than the illustration of FIG. 13.

(3) A refresh rate is not limited to 60 Hz, and may be higher or lower than 60 Hz. However, if a refresh rate is set to be lower than 30 Hz, there is concern that flickering is likely to be visually recognized. For this reason, it is preferable to set a refresh rate to be equal to or higher than 30 Hz from the viewpoint of preventing flickering. Further, as a refresh rate is changed, at least one of the number of times the first image is rewritten in the first display period DP1 and the number of times the second image is rewritten in the second display period DP2 can be changed.

(4) In the second embodiment, when performing display in the second display mode, the control unit 30 may turn on some of the first LEDs 13, not all of the first LEDs 13, in the second display period DP2 and turn off the rest of the first LEDs 13.

(5) In the third embodiment, the ratios of the standby periods WP1 and WP2 and the lighting periods LP1 and LP2 occupying the unit display period DP may not be equal to each other. To be specific, the standby periods WP1 and WP2 may be longer or shorter than the lighting periods LP1 and LP2.

(6) In the third embodiment, the first standby period WP1 may be set in the first display period DP1, and the second standby period WP2 may not be set in the second display period DP2. In this case, the timing at which the second display period DP2 starts matches the timing at which the second LED 17 is turned on.

(7) In the third embodiment, the second standby period WP2 may be set in the second display period DP2, and the first standby period WP1 may not be set in the first display period DP1. In this case, the timing at which the first display period DP1 starts matches the timing at which the selected first LEDs 13 is turned on.

(8) Technical matters described in the third embodiment may be combined with those of the second embodiment.

(9) In the fourth embodiment, the ratio of the first display period DP1 to the second display period DP2 occupying the unit display period DP may be appropriately changed to a value other than "3:1".

(10) Technical matters described in the fourth embodiment may be combined with those of the second embodiment.

(11) Technical matters described in the fourth embodiment may be combined with those of the third embodiment. In this case, although both the first standby period WP1 and the second standby period WP2 may be set, only the first standby period WP1 may be set, or only the second standby period WP2 may be set.

(12) It is also possible to set the ratio of the second display period DP2 occupying the unit display period DP higher than the ratio of the first display period DP1.

(13) The configuration of each of the louver 16 and the light guide plate 18 (the width-to-height ratio of the light transmitting portions 16D, the inclination angles of the inclined surfaces 22A and 22B of the third lens 22, and the like) may be appropriately changed in accordance with the required first angle range A1 and second angle range A2. Configurations other than the light transmitting portions 16D included in the louver 16 can also be appropriately changed. Configurations other than the third lens 22 included in the light guide plate 18 can also be appropriately changed.

(14) The first backlight unit 12U1 may be of the edge-lit type instead of the direct-lit type.

(15) The second backlight unit 12U2 may be of the direct-lit type instead of the edge-lit type.

(16) An optical component other than the louver 16 can be set as a "first light control unit".

(17) An optical component other than the light guide plate 18 can be set as a "second light control unit".

(18) A specific way of arranging the plurality of first LEDs 13 on the main surface of the LED substrate 14 can be changed as appropriate. For example, the plurality of first LEDs 13 may be arranged in a staggered manner on the main surface of the LED substrate 14.

(19) A light source such as an organic electro luminescence (EL) may be used instead of the first LEDs 13 and the second LED 17.

(20) The backlight device 12 may include a louver that restricts an emission angle range of light in the Y-axis direction on the front side of the light guide plate 18 or the diffuser sheet 19 in order to prevent reflection of light on the windshield of the passenger car.

(21) The diffuser sheet 19 may be omitted.

(22) The liquid crystal display device 10 for vehicle application may be installed at a position other than the front of the front passenger seat of a passenger car. For example, the liquid crystal display device 10 may be installed at a position between the front passenger seat and the driver's seat, and the like. Since the required first angle range A1 and second angle range A2 are also changed according to a change in the arrangement of the liquid crystal display device 10, the configuration (a width-height ratio of each light transmitting portion 16D, an inclination angle of each of the inclined surfaces 22A and 22B of the third lens 22, or the like) of the louver 16 and the light guide plate 18 may be changed accordingly.

(23) The liquid crystal display device 10 can also be used in devices, for example, automatic teller machines (ATMs), notebook computers, tablet computers, and the like of which viewing angles need to be restricted, in addition to the vehicle application. Since the required first angle range A1 and second angle range A2 are also changed when the application of liquid crystal display device 10 is changed, the configuration (a width-height ratio of each light transmitting portion 16D, an inclination angle of each of the inclined surfaces 22A and 22B of the third lens 22, or the like) of the louver 16 and the light guide plate 18 may be changed accordingly.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:
a display panel including a first main surface;
an illumination device configured to radiate light to the first main surface; and
a control unit configured to control the display panel and the illumination device,
wherein the illumination device includes
a plurality of first light sources;
a first light control unit configured to impart an optical effect to light emitted from the plurality of first light sources, not to regulate emission of light in a first angle range around a first direction having an angle with respect to the first main surface, and to regulate emission of light in a second angle range around a second direction having an angle different from the angle in the first direction with respect to the first main surface;
a second light source; and
a second light control unit configured to impart an optical effect to light emitted from the second light source and cause the light to be emitted at least in the second angle range,
the control unit switches between display in a first display mode and display in a second display mode based on input of a display switching signal,
when performing display in the first display mode, the control unit corrects an image signal to generate a correction signal, writes a first image based on the correction signal in the display panel, leaves the second light source unlit, and selectively turns on the plurality of first light sources based on the correction signal, and
when performing display in the second display mode, the control unit causes a unit display period to include a first display period and a second display period, generates the correction signal, writes the first image in the display panel, leaves the second light source unlit, and selectively turns on the plurality of first light sources based on the correction signal, in the first display period, and writes a second image based on the image signal in the display panel and turns on at least the second light source, in the second display period.

2. The display device according to claim 1,
wherein when performing display in the second display mode, the control unit leaves all of the plurality of first light sources unlit in the second display period.

3. The display device according to claim 1,
wherein when performing display in the second display mode, the control unit turns on all of the plurality of first light sources in the second display period.

4. The display device according to claim 1,
wherein when performing display in the second display mode, the control unit writes the first image in the display panel and then selectively turns on the plurality of first light sources based on the correction signal after a first standby period elapses, in the first display period.

5. The display device according to claim 1,
wherein when performing display in the second display mode, the control unit writes the second image in the display panel and then turns on at least the second light source after a second standby period elapses, in the second display period.

6. The display device according to claim 1,
wherein the control unit sets a ratio of the first display period occupying the unit display period to be equal to a ratio of the second display period.

7. The display device according to claim 1,
wherein the control unit sets a ratio of the first display period occupying the unit display period to be higher than a ratio of the second display period.

8. The display device according to claim 1,
wherein the first light control unit causes the first direction to match a normal direction of the first main surface, and includes at least two light blocking portions that are arranged at an interval in a third direction along both of the first main surface and a surface in the first direction and the second direction and that block light, and a light transmitting portion that is arranged between the two light blocking portions and that transmits light.

9. The display device according to claim 1,
wherein the plurality of first light sources are arranged side by side at an interval within the first main surface.

10. The display device according to claim 1,
wherein the second light control unit is a light guide plate including a second main surface and a third main surface parallel to the first main surface,
at least a part of an outer circumferential end surface of the light guide plate is a first end surface that faces the second light source and receives incidence of light, the second main surface emits light, and the third main surface is arranged facing the first light control unit,
the second light source is arranged side by side with the light guide plate in a third direction along both the first main surface and a surface in the first direction and the second direction, and
the third main surface is provided with a lens including an inclined surface with an inclination rising from a side opposite to the second light source in the third direction toward the second light source.

* * * * *